United States Patent [19]
Shimomura et al.

[11] Patent Number: 5,866,638
[45] Date of Patent: Feb. 2, 1999

[54] INK FOR TWO-PART LIQUID SYSTEM RECORDING, AND INK SET, INK CONTAINER, RECORDING UNIT, RECORDING PROCESS AND RECORDING APPARATUS USING THE SAME

[75] Inventors: Masako Shimomura, Yokohama; Hiromichi Noguchi, Hachioji; Isao Kimura, Kawasaki; Hiroyuki Maeda, Yokohama; Hidemi Kubota, Komae, all of Japan

[73] Assignee: Canon Kabushiki Kaisha, Tokyo, Japan

[21] Appl. No.: 753,611

[22] Filed: Nov. 27, 1996

[30] Foreign Application Priority Data

Dec. 1, 1995 [JP] Japan .................................. 7-314392

[51] Int. Cl.$^6$ ...................................... C09D 5/06
[52] U.S. Cl. ................... 523/16; 106/31.46; 106/31.47; 106/31.58; 106/31.76
[58] Field of Search .............................. 106/39.46, 31.47, 106/31.48, 31.58, 31.76, 31.77, 31.78, 31.86

[56] References Cited

U.S. PATENT DOCUMENTS

| | | | |
|---|---|---|---|
| 4,246,154 | 1/1981 | Yao ..................... | 260/29.6 T |
| 4,597,794 | 7/1986 | Ohta et al. ............... | 106/20 |
| 4,631,085 | 12/1986 | Kawanishi et al. ........... | 106/22 |
| 4,680,332 | 7/1987 | Hair et al. ............... | 524/377 |
| 5,100,471 | 3/1992 | Winnik et al. ............. | 106/23 |
| 5,106,417 | 4/1992 | Hauser et al. ............. | 106/20 |
| 5,172,133 | 12/1992 | Suga et al. ............... | 346/1.1 |
| 5,229,786 | 7/1993 | Suga et al. ............... | 346/1.1 |
| 5,254,158 | 10/1993 | Breton et al. ............. | 106/20 R |
| 5,409,529 | 4/1995 | Nagashima et al. .......... | 106/22 H |
| 5,439,515 | 8/1995 | Kurabayashi et al. ........ | 106/20 R |
| 5,579,038 | 11/1996 | Kimura ................... | 347/36 |

FOREIGN PATENT DOCUMENTS

| | | |
|---|---|---|
| 0 355 062 | 2/1990 | European Pat. Off. . |
| 0 425 439 | 5/1991 | European Pat. Off. . |
| 0 465 124 | 1/1992 | European Pat. Off. . |
| 0 581 135 A1 | 2/1994 | European Pat. Off. . |
| 0 584 509 | 3/1994 | European Pat. Off. . |
| 0 618 278 | 10/1994 | European Pat. Off. . |
| 0663299A2 | 7/1995 | European Pat. Off. . |
| 0 671 447 A2 | 9/1995 | European Pat. Off. . |
| 58-013675 | 1/1983 | Japan . |
| 59-78273 | 5/1984 | Japan . |
| 62-053377 | 3/1987 | Japan . |
| 62-181372 | 8/1987 | Japan . |
| 63-22681 | 1/1988 | Japan . |
| 63-60783 | 3/1988 | Japan . |
| 63-299971 | 12/1988 | Japan . |
| 64-9279 | 1/1989 | Japan . |
| 64-63185 | 3/1989 | Japan . |
| 1-272623 | 10/1989 | Japan . |
| 3-91577 | 4/1991 | Japan . |
| 3-172362 | 7/1991 | Japan . |
| 3-240586 | 10/1991 | Japan . |
| 6-009848 | 1/1994 | Japan . |
| 6-049399 | 2/1994 | Japan . |

OTHER PUBLICATIONS

Croucher et al., "Design Criteria and Future Directions in Ink Inkjet Technology," Ind. Eng. Chem. Res. 28(11):1712–1718 (Nov. 1989).

Osada et al., J. Chem. Soc. Japan, 1976 (1):171–174 (English Abstract andTranslation).

Osada et al., J. Chem. Soc. Japan, 1983 (6):812–818 (English Abstract).

Osada et al., J. Chem. Soc. Japan, 1976 (5):832–836 (English Abstract).

Prasad et al., "Surface Activity and Association of ABA Polyoxyethylene–Polyoxypropylene Block Copolymers in Aqueous Solution," J. Colloid & Interface Sci. 63(2):225–232 (Apr. 1979).

*Primary Examiner*—Edward J. Cain
*Attorney, Agent, or Firm*—Fitzpatrick, Cella, Harpr & Scinto

[57] ABSTRACT

Disclosed herein is a recording ink suitable for use in image recording together with a liquid composition containing a cationic substance, wherein the recording ink comprises a coloring material and a water-soluble polymeric compound which exhibits nonionic properties in the ink and has an alicyclic, nitrogen-containing heterocycle.

82 Claims, 7 Drawing Sheets though the degree of improvement in the desired property is limited so that the degree of deterioration of the properties to be deteriorated may not become a problem from the viewpoint of practical use. As described above, improvements in ink-jet ink itself have both merits and demerits.

INK FOR TWO-PART LIQUID SYSTEM RECORDING, AND INK SET, INK CONTAINER, RECORDING UNIT, RECORDING PROCESS AND RECORDING APPARATUS USING THE SAME

BACKGROUND OF THE INVENTION

1. Field of the Invention

The present invention relates to a recording process adapted to conduct recording with an ink set comprising in combination two liquids of different compositions, and various apparatus and members, for example, a recording apparatus and an ink set, necessary for the recording process. Namely, this invention relates to an invention in which the epochal properties of a liquid composition, which have not been predictable to date, are applied rationally and synthetically to an image-forming system, and more particularly to a liquid composition, such as an ink, to be used in a field of recording with ink, and an image-forming process and apparatus, composite system, printing system, sales system and the like using such a liquid composition, or a printer, facsimile terminal equipment, communication system, display/exhibition system and the like using the same.

The present invention also relates to an invention extremely effective for an ink-jet system using a system that an ink is ejected on a recording medium such as paper or paper for over-head projector (OHP).

2. Related Background Art

As image formation by recording with ink, there have heretofore been mainly known image formation by contact-type inking, in which an ink supply means is brought into contact with a desired portion of a recording medium to form an image on this portion, and image formation by noncontact-type inking, in which an ink is applied to a desired portion of a recording medium in a state that an ink supply means is in no contact with the recording medium, thereby forming an image. In particular, the latter image-forming process has come to be often used as an ink-jet system in recent years. This ink-jet system is roughly divided into a bubble ink-jet system making good use of thermal energy for the ejection of ink and a piezoelectric system making good use of mechanical change.

In general, inks used in these systems have been improved compositionally from a view point of the purpose of recording bright images on a recording medium such as paper or paper for OHP or of stabilizing their ejection state from an ink-jet head and their behavior in the head. With the application of the ink-jet systems to a wide variety of fields in recent years, high level of various demands have come to be made even on the performance of ink. Techniques for these improvements are also going to develop more highly. However, many of inks for ink-jet maintain their ink-jet properties by delicately balancing their various physical properties with one another. Therefore, when an improvement of a desired property is attempted, other properties may be often deteriorated. In such a case, the degree of improvement in the desired property is limited so that the degree of deterioration of the properties to be deteriorated may not become a problem from the viewpoint of practical use. As described above, improvements in ink-jet ink itself have both merits and demerits.

Various attempts have therefore been made to achieve good recording characteristics without more highly modifying the physical properties themselves of ink. For example, there has been proposed a technique for insolubilizing a coloring material in an ink on a recording medium with a view toward enhancing the water fastness of the resulting image.

Specifically, for example, Japanese Patent Application Laid-Open No. 63-60783 discloses a method in which after a liquid containing a basic polymer is applied to a recording medium, an ink containing an anionic dye is applied thereto, thereby conducting recording. Japanese Patent Application Laid-Open No. 63-22681 discloses a recording method in which a first liquid containing a reactive chemical species and a second liquid containing a compound reacting with the reactive chemical species are mixed on a recording medium. Further, Japanese Patent Application Laid-Open No. 63-299971 discloses a method in which a liquid containing an organic compound having two or more cationic groups per molecule is applied to a recording medium, and recording is then conducted with inks containing an anionic dye. Japanese Patent Application Laid-Open No. 64-9279 discloses a method in which after an acidic liquid containing succinic acid is applied to a recording medium, an ink containing an anionic dye is applied thereto, thereby conducting recording.

Further, Japanese Patent Application Laid-Open No. 64-63185 discloses a method of applying a liquid (insolubilizing agent), which insolubilizes a dye, to a recording medium prior to application of ink. As a method of using this insolubilizing agent, EP-A-663299 to the present applicant discloses an image-recording method capable of forming high-quality images, in which a recording ink is used in combination with a liquid composition containing a cationic or nonionic substance as an insolubilizing agent.

SUMMARY OF THE INVENTION

According to an investigation by the present inventors, the following phenomenon has been observed. Namely, when an insolubilizing agent is applied to a recording medium, as in the prior art, and an ink is then applied to the recording medium so as to contact with the insolubilizing agent for the purpose of improving the water fastness of the resulting images, at the time an ink droplet is subsequently impacted on a droplet of the insolubilizing agent first applied to the recording medium, a splash is generated to a greater extent due to rebound of the droplets by their impact and attached to a recording head as the velocity of the ink droplet to be impacted is increased. The main range of this rebound has widely varied from 500 $\mu$m to 1,000 $\mu$m. It has been newly found that this rebound phenomenon may form a cause of problems of defective ejection of ink from a head for the ink, ejection failure and the like in some cases. More specifically, if the insolubilizing agent is contained in this splash due to the rebound, it reacts with minute ink mist generated at the time the ink is ejected from a recording head for the ink, so as to be united. Then, the insolubilized product of the ink component (mainly, a coloring material) formed by this reaction grows in the vicinity of an ink ejection orifice in the worst case to narrow or block the ink ejection orifice, whereby the ejecting direction of the ink is deflected in an undesirable direction, or the ejection of the ink is temporally interrupted.

Namely, it has been found that in the conventional recording process using two liquids of an insolubilizing agent and an ink, when ink droplets are applied at higher velocity for the purpose of further enhancing recording speed, the problem as described above tends to occur. It has thus been concluded that the achievement of good recording at higher speed requires a technique for preventing the generation of a splash due to the rebound.

The present inventors have carried out a further investigation as to inks and insolubilizing agents therefor with a view toward solving the new problem in such a recording process of the two-part liquid system. In the course of this investigation, no fully satisfactory results have been obtained from compositional changes within the range of various known components used as components for the conventional inks and insolubilizing agents. Under the circumstances, one of the present inventors had variously carried out an investigation as to the reactivity of two substances in water and then observed a phenomenon that when two kinds of reactive substances were placed in a beaker to form a stable turbid state, and this turbid solution was agitated by a glass rod, the turbid solution turned transparent, and a reaction product attached to the glass rod. From this phenomenon, the present inventors have got a hint to the effect that a substance, which is inert in ink, has no influence or little influence to an almost negligible extent on the physical properties and the like of ink, and rapidly causes an aggregation reaction of a coloring material upon contact with an insolubilizing agent, is effective for the solution of the above-described problem. The present inventors have carried out a still further investigation on the basis of this hint. As a result, the present inventors have been led to a new finding that water-soluble polymeric compounds having, for example, an alicyclic, nitrogen-containing heterocycle have such properties.

The present invention has been completed on the basis of such a new finding by the present inventors.

It is an object of the present invention to provide a recording ink which can exhibit the recording characteristics of the two-part liquid system to the maximum without changing the properties of the ink, make the resulting recorded images high-quality and also prevent the rebound of liquid as described above.

It is another object of the present invention to provide an image-forming process comprising applying a plurality of liquids, for example, an insolubilizing agent and an ink, or a plurality of inks to a recording medium to form a pixel of an image, which the process can prevent at least one liquid from splashing at the time the plurality of liquids is united on the recording medium, thereby stably recording high-quality images.

A further object of the present invention is to provide an image-forming apparatus which can stably record high-quality-images, and an ink set to be used in such an apparatus.

The above objects can be achieved by the present invention described below.

In an aspect of the present invention, there is thus provided a recording ink suitable for use in image recording together with a liquid composition containing a cationic substance, wherein the recording ink comprises a coloring material and a water-soluble polymeric compound which exhibits nonionic properties in the ink and has an alicyclic, nitrogen-containing heterocycle.

In the above aspect of the present invention, there is also provided a process of recording an image by using a liquid composition containing a cationic substance and the recording ink described above in combination to record an image on an image-forming region of a recording medium, which the process comprises the steps of:

(A) applying the liquid composition to at least the image-forming region of the recording medium; and (B) applying the recording ink to the image-forming region.

In the above aspect of the present invention, there is further provided an ink set comprising in combination i) a liquid composition containing a cationic substance and ii) the above-described recording ink comprising a coloring material and a water-soluble polymeric compound which exhibits nonionic properties in the ink and has an alicyclic, nitrogen-containing heterocycle, wherein the recording ink is a color ink using, as the coloring material, a coloring material for yellow, magenta, cyan, black, red, blue or green, and at least one ink of these color inks is combined with the liquid composition.

In the above aspect of the present invention, there is still further provided an image-recording apparatus comprising:

a first recording unit equipped with a recording ink-containing part which contains the recording ink described above and a recording ink-applying means for applying the recording ink to a recording medium; and a second recording unit equipped with a liquid composition-containing part which contains a liquid composition containing a cationic substance and a liquid composition-applying means for applying the liquid composition to the recording medium.

In the above aspect of the present invention, there is yet still further provided an ink container comprising an ink-containing part which contains an ink, wherein the recording ink described above is contained as said ink in the ink-containing part.

In the above aspect of the present invention, there is yet still further provided a recording unit comprising a recording ink-containing part which contains the recording ink described above and a recording ink-applying means for applying the recording ink to a recording medium.

According to the above aspect of the present invention, there are provided materials and means for applying the reaction of the cationic substance, coloring material and water-soluble polymeric compound to the recording of images. The water-soluble polymeric compound having an alicyclic, nitrogen-containing heterocycle is contained in the recording ink, and the insolubilization of the coloring material is effectively conducted by making good use of the reaction of these components, thereby permitting not only the recording of high-quality images fully prevented from causing bleeding and feathering while maintaining various recording characteristics within good limits, but also the solution of the problem newly elucidated by the present inventors and caused in the case where the conventional two-part liquid system is used, namely, the achievement of the object that the rebound of liquids on the side of a recording head at the time a liquid is applied in advance to a recording medium, and another liquid is further applied so as to overlap the first liquid is effectively prevented, thereby conducting stable recording of images for a long period of time.

In another aspect of the present invention, there is thus provided a recording ink suitable for use in a process of recording an image by applying an ink to a recording medium together with a liquid composition containing a cationic substance by means of an ink-jet recording system to form a pixel for the image, wherein the recording ink comprises a coloring material and a water-soluble polymeric compound, and wherein the recording ink provides substantially no attachment of the liquid composition to a face of an ejection opening for the recording ink when applying the recording ink onto the liquid composition provided on the recording medium, even under conditions that the liquid composition is attached to the face of an ejection opening for recording ink due to a splash of the liquid composition generated by an impact of an application of a recording ink containing no water-soluble polymeric compound onto the liquid composition provided on the recording medium.

In the above aspect of the present invention, there is also provided an ink-jet recording process for recording an image by using a recording ink and a liquid composition containing a cationic substance in combination, comprising the steps of:
(A) applying the liquid composition to at least an image-forming region of a recording medium; and
(B) applying the recording ink to the image-forming region of the recording medium, wherein the recording ink comprises a coloring material and a water-soluble polymeric compound, and wherein the recording ink substantially prevents the liquid composition from attaching to a face of an ejection opening for recording ink when applying the recording ink onto the liquid composition on the recording medium, even under conditions that when a recording ink containing no water-soluble polymeric compound is applied onto the liquid composition applied to the recording medium, a splash is generated from the liquid composition on the recording medium due to impact of the application and attached to the face of an ejection opening for recording ink.

In the above aspect of the present invention, there is further provided an image-recording apparatus comprising:
a first recording unit equipped with a recording ink-containing part which contains the recording ink described above and a recording ink-applying means for applying the recording ink to a recording medium; and
a second recording unit equipped with a liquid composition-containing part which contains a liquid composition containing a cationic substance and a liquid composition-applying means for applying the liquid composition to the recording medium.

In the above aspect of the present invention, there is still further provided an ink set comprising in combination i) a liquid composition containing a cationic substance and ii) the recording ink described above, wherein the recording ink is a color ink using, as the coloring material, a coloring material for yellow, magenta, cyan, black, red, blue or green, and at least one ink of these color inks is combined with the liquid composition.

In the above aspect of the present invention, there is yet still further provided an ink container comprising an ink-containing part, wherein the recording ink described above is contained as said ink in the ink-containing part.

In the above aspect of the present invention, there is yet still further provided a recording unit comprising a recording ink-containing part which contains the recording ink described above and a recording ink-applying means for applying the recording ink to a recording medium.

According to the above aspect of the present invention, the recording ink or the liquid composition can be effectively prevented from failing to eject from a recording head of an ink-jet system, thereby permitting stable recording of images for a long period of time. Incidentally, the words "substantially prevents the liquid composition from attaching to a face of an ejection opening for recording ink" and the words "substantially no attachment of the liquid composition to a face having an ejection opening for the recording ink" mean that the liquid composition, for example, due to the splash, is not attached to the face of the ejection opening at all or that the liquid composition, for example, due to the splash, can be removed by a usual cleaning means if attached.

In a further aspect of the present invention, there is thus provided a recording ink suitable for use in image recording using a bubble ink-jet system together with a liquid composition containing a cationic substance, wherein the recording ink comprises a coloring material and a water-soluble polymeric compound which exhibits nonionic properties in the ink and has an alicyclic, nitrogen-containing heterocycle.

In the above aspect of the present invention, there is also provided a process of recording an image by using a recording ink comprising a water-soluble polymeric compound having an alicyclic, nitrogen-containing heterocycle and a coloring material, and a liquid composition containing a cationic substance, which the process comprises the steps of:
(A) applying the liquid composition to at least an image-forming region of a recording medium; and
(B) applying the recording ink to the image-forming region of the recording medium, wherein at least a later step of the steps (A) and (B) comprises a step of applying a liquid to the recording medium by means of a bubble ink-jet system.

In the above aspect of the present invention, there is further provided an image-recording apparatus comprising:
a first unit equipped with a recording ink-containing part which contains the recording ink described above and a recording ink-applying means for applying the recording ink to a recording medium; and
a second unit equipped with a liquid composition-containing part which contains a liquid composition containing a cationic substance and a liquid composition-applying means for applying the liquid composition to the recording medium, wherein at least one of the recording ink-applying means and the liquid composition-applying means is a means for applying a liquid to the recording medium by means of a bubble ink-jet system.

According to the above aspect of the present invention, the application of at least one of the recording ink and the liquid composition containing the cationic substance is conducted by means of the bubble ink-jet system, whereby the effects of the present invention can be still more enhanced. In particular, when one of the recording ink and the liquid composition containing the cationic substance is first applied to a recording medium, and the other is then applied to the recording medium, at least the later application step is conducted by means of the bubble ink-jet system, whereby the rebound-preventing effect can be still more enhanced.

In a still further aspect of the present invention, there is thus provided a recording ink suitable for use in image recording together with a liquid composition having fractions not higher than 1,000 in terms of molecular weight and higher than 1,000 in terms of molecular weight, respectively, when its molecular weight distribution is measured by means of gel permeation chromatography (GPC), said fractions not higher than 1,000 in terms of molecular weight and higher than 1,000 in terms of molecular weight each containing a cationic substance, wherein the recording ink comprises an anionic coloring matter and a water-soluble polymeric compound which has an alicyclic, nitrogen-containing heterocycle and exhibits nonionic properties in a liquid.

In the above aspect of the present invention, there is also provided a process of recording an image by using a recording ink comprising a water-soluble polymeric compound, which has an alicyclic, nitrogen-containing heterocycle and exhibits nonionic properties in a liquid, and an anionic coloring matter, and a liquid composition having fractions not higher than 1,000 in terms of molecular weight and higher than 1,000 in terms of molecular weight, respectively, when its molecular weight distribution is measured by means of gel permeation chromatography (GPC), said fractions not higher than 1,000 in terms of molecular weight and higher than 1,000 in terms of molecular weight each containing a cationic substance, which the process comprises the steps of:

(A) applying the liquid composition to at least an image-forming region of a recording medium; and (B) applying the recording ink to the image-forming region of the recording medium.

In the above aspect of the present invention, there is further provided an ink set comprising in combination:

a liquid composition having fractions not higher than 1,000 in terms of molecular weight and higher than 1,000 in terms of molecular weight, respectively, when its molecular weight distribution is measured by means of gel permeation chromatography (GPC), said fractions not higher than 1,000 in terms of molecular weight and higher than 1,000 in terms of molecular weight each containing a cationic substance; and at least one recording ink of recording inks of yellow, magenta, cyan, black, red, blue and green, wherein the recording ink comprises a water-soluble polymeric compound, which has an alicyclic, nitrogen-containing heterocycle and exhibits nonionic properties in a liquid, and an anionic coloring matter.

In the above aspect of the present invention, there is still further provided an image-recording apparatus comprising:

a first recording unit equipped with a container part which contains a recording ink comprising a water-soluble polymeric compound, which has an alicyclic, nitrogen-containing heterocycle and exhibits nonionic properties in a liquid, and an anionic coloring matter, and a means for applying the recording ink to a recording medium; and a second recording unit equipped with a container part which contains a liquid composition having fractions not higher than 1,000 in terms of molecular weight and higher than 1,000 in terms of molecular weight, respectively, when its molecular weight distribution is measured by means of gel permeation chromatography (GPC), said fractions not higher than 1,000 in terms of molecular weight and higher than 1,000 in terms of molecular weight each containing a cationic substance, and a means for applying the liquid composition to the recording medium.

In the above aspect of the present invention, there is yet still further provided an ink container comprising a container part containing an ink, wherein the recording ink described above is contained as said ink.

According to the above aspect of the present invention, the effects of the present invention can be still more enhanced.

In a yet still further aspect of the present invention, there is thus provided a recording ink suitable for use in image recording together with a liquid composition containing a compound having a first polarity, wherein the recording ink comprises a coloring material having a second polarity opposite to the first polarity and a water-soluble polymeric compound having a group, which causes intramolecular polarization, and exhibiting nonionic properties in a liquid.

In the above aspect of the present invention, there is also provided a process of recording an image on a recording medium by using in combination a liquid composition containing a compound having a first polarity, and a recording ink comprising a coloring material having a second polarity opposite to the first polarity and a water-soluble polymeric compound having a group, which causes intramolecular polarization, and exhibiting nonionic properties in a liquid, which the process comprises the steps of:

(A) applying the liquid composition to at least an image-forming region of the recording medium; and (B) applying the recording ink to the image-forming region of the recording medium.

In the above aspect of the present invention, there is further provided an image-recording apparatus comprising:

a first recording unit equipped with a liquid composition-containing part which contains a liquid composition containing a compound having a first polarity, and a liquid composition-applying means for applying the liquid composition to a recording medium;

a second recording unit equipped with a recording ink-containing part which contains a recording ink comprising a coloring material having a second polarity opposite to the first polarity and a water-soluble polymeric compound having a group, which causes intramolecular polarization, and exhibiting nonionic properties in a liquid, and a recording ink-applying means for applying the recording ink to a recording medium.

In the above aspect of the present invention, there is still further provided an ink container comprising an ink-containing part which contains an ink, wherein the recording ink described above is contained as said ink in the ink-containing part.

In the above aspect of the present invention, there is yet still further provided a recording unit comprising a recording ink-containing part which contains the recording ink described above and a means for applying the recording ink to a recording medium.

In the above aspect of the present invention, there is yet still further provided an ink set comprising in combination:

i) a liquid composition containing a compound having a first polarity; and ii) the recording ink described above, wherein the recording ink is a color ink using, as the coloring material, a coloring material for yellow, magenta, cyan, black, red, blue or green, and at least one ink of these color inks is combined with the liquid composition.

According to the above aspect of the present invention, the effects of the present invention, such as prevention of bleeding, prevention of feathering, enhancement of the water fastness of the resulting recorded images and prevention of rebound, can be achieved.

DESCRIPTION OF THE PREFERRED EMBODIMENTS

Figure 1:
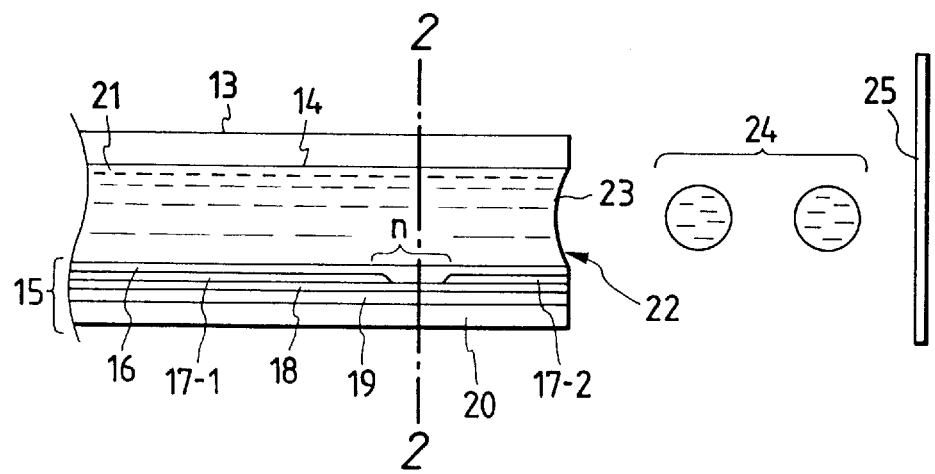
FIG. 1 is a longitudinal cross-sectional view of a head of an ink-jet recording apparatus.

The action or effect of the present invention will now be described. In the present invention, one of the liquid composition containing a cationic substance (hereinafter referred to as "cation-containing liquid composition) and the recording ink is applied to a recording medium in advance, and the other is then applied so as to overlap the former. In this time, the components in these two liquids react with each other on the recording medium, thereby preventing the rebound of the liquids, and the fixing of the coloring material component is also started momentarily, whereby feathering that a recording ink runs out along fibers of the recording medium and so a whisker-like pattern appears around dots and the contours of the dots are blurred, and also bleeding that when dots of different colors are printed adjoiningly to each other, color mixing occurs at boundaries between the dots, and the like, which form the cause of deterioration of the resulting image, can be prevented. The above action in the present invention caused by using the water-soluble polymeric compound having an alicyclic, nitrogen-containing heterocycle and exhibiting nonionic properties in a liquid can be assumed from a phenomenon that when, for example, an anionic dye, the water-soluble polymeric compound having an alicyclic, nitrogen-containing heterocycle and a cationic substance are coexisted with one another, these components react at high speed, as follows.

Namely, in the water-soluble polymeric compound, a site polarized into a positive polarity is produced in a branched chain to which the alicyclic, nitrogen-containing heterocycle is bonded. However, this polarization is weak, so that even when the anionic dye is somewhat localized on this positive site in the recording ink, the anionic dye is not bonded to the water-soluble polymeric compound. Moreover, since the water-soluble polymeric compound exhibits nonionic properties in a solution, the properties of the recording ink are not changed by the addition of the water-soluble polymeric compound. When the cation-containing liquid composition is brought into contact with the recording ink of this state, the cationic substance contained in the liquid composition and the anionic dye are tonically bonded, so that the motion of the anionic dye in the reaction mixture is regulated, and moreover the reactivity of the anionic dye in the state tonically bonded to the cationic substance is also changed. Therefore, the anionic dye becomes liable to react with the polarized site of the water-soluble polymeric compound. As a result, a giant, water-insoluble aggregate in the form that the cationic substance is bonded to the water-soluble polymeric compound via the anionic dye is formed.

This aggregate-forming reaction is far faster than the formation of an aggregate in the conventional recording process of the two-part liquid system in which no water-soluble polymeric compound having an alicyclic, nitrogen-containing heterocycle is added to a recording ink. Therefore, when this reaction is applied to, for example, an image-recording process using an ink-jet system, this aggregate-forming reaction is started momentarily at the time the recording ink comes into contact with the cation-containing liquid composition at a contact interface between them. The aggregate formed forms the main cause of changes in liquid properties, such as viscosity increase and is an obstacle to the rebound itself, whereby the rebound can be effectively prevented.

On the recording medium, the momentary formation of this water-insoluble aggregate causes rapid separation of the coloring material in the recording ink applied thereto from a liquid medium, whereby bleeding and feathering are effectively prevented, and so the formation of a high-quality image is made possible. In addition, since this aggregate is insoluble in water, the water fastness of the resulting image is far excellent.

The above assumption is considered to be right judging from, for example, the fact that even if a reaction system of the same composition as described above except that the coloring material is not contained, namely, the cation-containing liquid composition and a liquid composition containing the water-soluble polymeric compound having an alicyclic, nitrogen-containing heterocycle, but not containing the coloring material are reacted, the formation of an aggregate as described above is not observed.

On such an assumption, it is considered that an image-forming process using a liquid composition containing an anionic substance and a recording ink comprising a water-soluble polymeric compound having a group, which causes intramolecular polarization, and exhibiting nonionic properties in a liquid, and a cationic dye (coloring matter) in combination also exhibits good effects.

The mechanism as to the still more enhanced effect for preventing the rebound, which is brought about by the application of a bubble ink-jet system as described above may also be assumed to be as follows.

Namely, when one of the recording ink and the cation-containing liquid composition is first applied to a recording medium, and a bubble ink-jet system is used at the time the other is then applied to the recording medium, the viscosity of the liquid applied later is reduced due to its temperature rise. As a result, the surface of the liquid applied first is covered over a wider range with the liquid applied later, so that an contact area between the two liquids becomes wider, and the aggregate-forming reaction occurs in a wider range, thereby bringing about a still more enhanced effect for preventing the rebound.

In the present invention, the combined use of two substances having a molecular weight not higher than 1,000 and having a molecular weight higher than 1,000 as the cationic substance is more effective. A reason for it is considered to be that the start-up of the aggregation reaction of the dye and the cationic substance by ionic interaction is accelerated by the presence of the cationic substance having a lower molecular weight, and the insolubilization of the aggregate due to its growth is accelerated by the cationic substance having a higher molecular weight.

The recording ink according to an aspect of the present invention is composed of at least a water-soluble polymeric compound having an alicyclic, nitrogen-containing heterocycle and a coloring material. The recording ink may contain an aqueous medium composed of water, a mixed solvent of water and a water-soluble organic solvent, or the like from the viewpoint of maintaining its liquid properties. Further, the recording ink may contain various additives according to the kinds of processes for applying it to a recording medium. When it is used in, for example, an ink-jet system, various components routinely used in inks for ink-jet, for example, viscosity modifiers, pH adjustors, antiseptics, surfactants, antioxidants and the like, may be suitably selected for use. Although the water-soluble polymeric compound having an alicyclic, nitrogen-containing heterocycle, which is added to the recording ink in the present invention, has a polarized part, its reactivity in the recording ink is low. Therefore, it usually does not react with other components of the ink to change the properties of the ink. However, there are some cases where they react with each other according to the kinds of the other components of the ink to greatly deteriorate the properties of the ink. In such a case, it is only necessary to avoid such a combination to change to another combination.

As the water-soluble polymeric compound having an alicyclic, nitrogen-containing heterocycle, any polymeric compound may be used without any particular limitation so far as it permits the rapid formation of the aggregate as described above while maintaining good recording characteristics. As examples of such a compound, may be mentioned water-soluble polymeric compounds having a repeating unit represented by the general formula

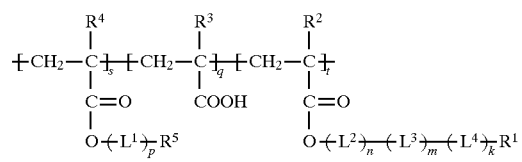

wherein $R^1$ is hydrogen, a methyl group, an ethyl group or $R^5$, where $R^5$ is one of the alicyclic, nitrogen-containing heterocycles of the formulae

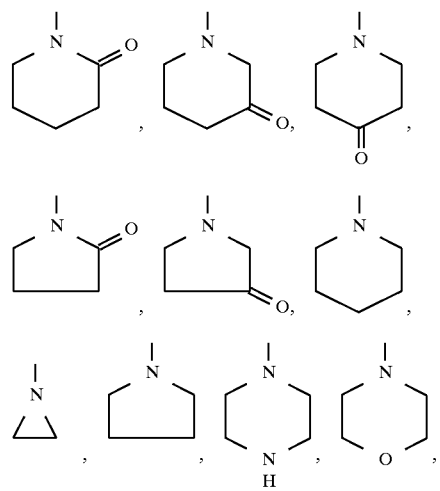

$R^2$ to $R^4$ are, independently of one another, hydrogen or an alkyl group having 1 to 3 carbon atoms, $L^1$ to $L^4$ are, independently of one another, a divalent group having a structure represented by —A—O— (—A— is an alkylene group having 2 to 4 carbon atoms, which may be substituted by a methyl or ethyl group), s, t and q are proportions of copolymerization, the sum of s and t is 90 to 99% by weight, q is 1 to 10% by weight, n and k are integers the sum of which ranges from 10 to 30, m is an integer of 15 to 30, and p is an integer of 1 to 5.

Among the compounds of the general formula (1), copolymers of (a) an acrylic ester of an ethylene oxide or propylene oxide adduct of a substituted morpholine, (b) acrylic acid and (c) a compound represented by the general formula

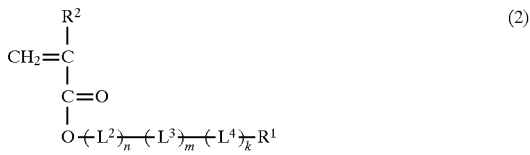

wherein $R^1$, $R^2$, $L^2$ to $L^4$, n, m and k have the same meaning as defined in the general formula (1), may be mentioned as more preferable compounds.

A water-soluble polymeric compound having a repeating unit represented by the general formula

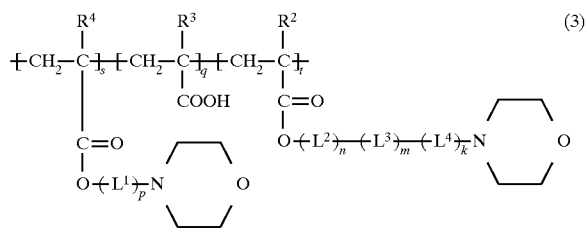

that both $R^1$ and $R^5$ in the general formula (1) are a morpholine ring of the formula

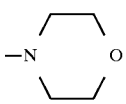

is more preferable, because the reactivity of the cationic substance contained in the cation-containing liquid composition with the water-soluble polymeric compound having an alicyclic, nitrogen-containing heterocycle and coloring material in the resulting recording ink becomes extremely good, and the stability of the recording ink itself also become far excellent.

As the water-soluble polymeric compound having an alicyclic, nitrogen-containing heterocycle, those in which the upper limit of the molecular weight (weight average molecular weight) as determined by gel permeation chromatography (GPC) (GPC column: TSG-gel GMHXL, in terms of polystyrene) is 300,000, and the lower limit is 5,000 are preferred, with those the upper limit of the molecular weight of which is 50,000 being more preferred. This is considered to be due to the fact that when a polymer within these molecular weight ranges is used, the formation of an aggregate at the time the recording ink comes into contact with the cationic substance takes place more quickly, so that bleeding can be prevented almost perfectly, and the technical object of preventing the rebound can be more satisfactorily achieved. Also, when the recording ink containing the polymeric compound within such a molecular weight range is applied to an ink-jet recording process using a heating element, i.e., a recording process by a bubble ink-jet system in which thermal energy is applied to eject a liquid, the occurrence of problems that deposit attaches on the heating element, and ejection failure of the recording ink occurs due to this attachment can be more effectively prevented. Namely, the recording ink using the water-soluble polymeric compound within such a molecular weight range is particularly suitable for use in the ink-jet recording process using a heating element.

The amount of the water-soluble polymeric compound having an alicyclic, nitrogen-containing heterocycle to be incorporated in the recording ink may be suitably selected according to the kind of a process for applying the resulting recording ink to a recording medium, and the like. For example, when the amount is substantially the same as the concentration of a coloring material, the resulting recording ink has advantages that the formation of an aggregate at the time of the contact of the recording ink with the cation-containing liquid composition is more accelerated, and the recording ink is easy to be applied to the bubble ink-jet system using a heating element.

As the coloring material to be contained in the recording ink, any coloring material may be used without any limitation so far as it permits the above-described formation of aggregate by the reaction of the cationic substance with the water-soluble polymeric compound having an alicyclic, nitrogen-containing heterocycle and can give the desired recording characteristics. Various kinds of coloring matter may be used as such materials. Examples thereof include water-soluble acid dyes, direct dyes and reactive dyes, which are described in COLOR INDEX, and besides water-soluble dyes having anionic groups, for example, a sulfonic group and/or a carboxylic group, which are not described in COLOR INDEX. Among the water-soluble dyes used herein, those having dependence of solubility on pH are also included. Among others, anionic dyes are preferred as the coloring material. The coloring material may be selected and incorporated according to the desired color of the resulting recording ink. For example, the selection of the coloring material permits the preparation of inks of yellow, magenta, cyan, black, red, blue and green colors. At least one of these color inks can be combined with the cation-containing liquid composition to use as an ink set. The content of the coloring material is preferably within a range of generally from 1 to 8% by weight, or from 3 to 10% by weight for using the resulting ink in recording on cloth, metal (alumite) and the like, or from 0.01 to 10% by weight in the case where variable density is required of the resulting recorded image.

As aqueous media usable in the recording ink in the present invention, may be mentioned water, mixed solvents of water and a water-soluble organic solvent, and the like. As the water, it is preferable to use ion-exchanged water or deionized water.

As examples of the water-soluble organic solvent used in combination with water, may be mentioned alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; alkylene glycols the alkylene group of which has 2 to 6 carbon atoms, such as ethylene glycol, thiodiglycol, hexylene glycol and diethylene glycol; 1,2,6-hexanetriol; glycerol; lower alkyl ethers of polyhydric alcohols, such as ethylene glycol monomethyl (or monoethyl) ether, diethylene glycol methyl (or ethyl) ether and triethylene glycol monomethyl (or monoethyl) ether; N-methyl-2-pyrrolidone; 2-pyrrolidone; and 1,3-dimethyl-2-imidazolidinone. Among a number of these water-soluble organic solvents, lower alkyl ethers of polyhydric alcohols such as diethylene glycol are preferred.

In order to achieve good ejection stability, it is effective to further add ethanol or isopropyl alcohol in an amount of 1% by weight or more because the addition of these solvents is considered to permit more stable bubbling of the recording ink on a thin film resistor (heating element) when the application of the recording ink to a recording medium is conducted by an ink-jet recording process using a heating element. However, the addition of these solvents in excess involves a drawback that the print quality of the resulting print is impaired. The suitable concentration of these solvents is 3 to 10% by weight. These solvents have a further effect that the addition of the solvents to a dispersion prevents foaming upon the preparation of the dispersion, thereby effectively conducting the dispersion.

The content of the water-soluble organic solvent in the recording ink according to the present invention is generally within a range of from 3 to 50% by weight, preferably from 3 to 40% by weight based on the total weight of the recording ink, while the amount of water to be used is within a range of from 10 to 90% by weight, preferably from 30 to 80% by weight based on the total weight of the recording ink.

Figure 11:
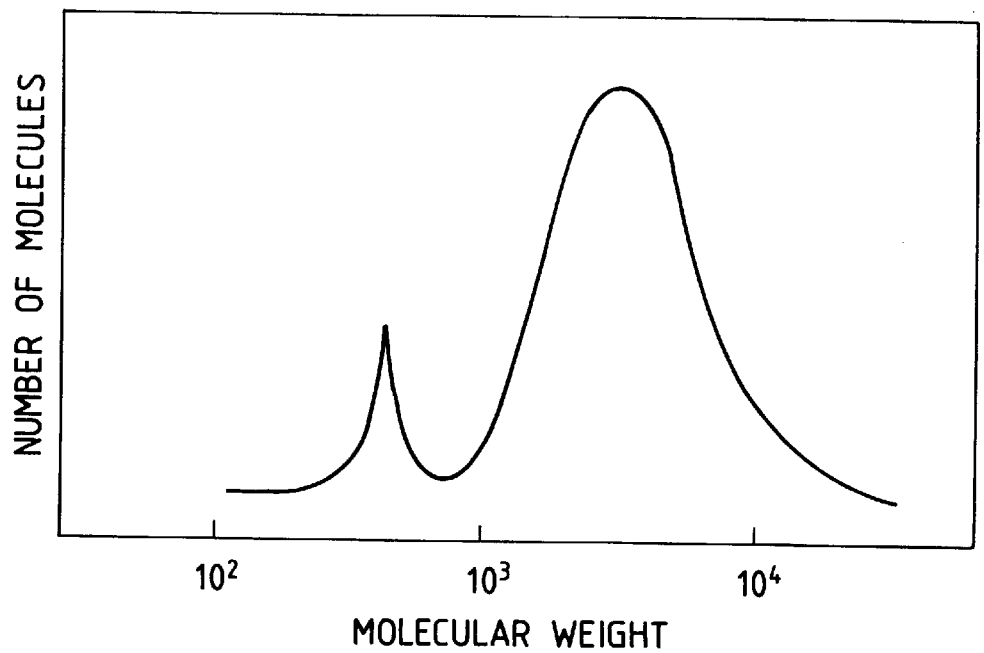
FIG. 11 diagrammatically illustrates another example of a molecular weight distribution of a liquid composition.
Figure 12:
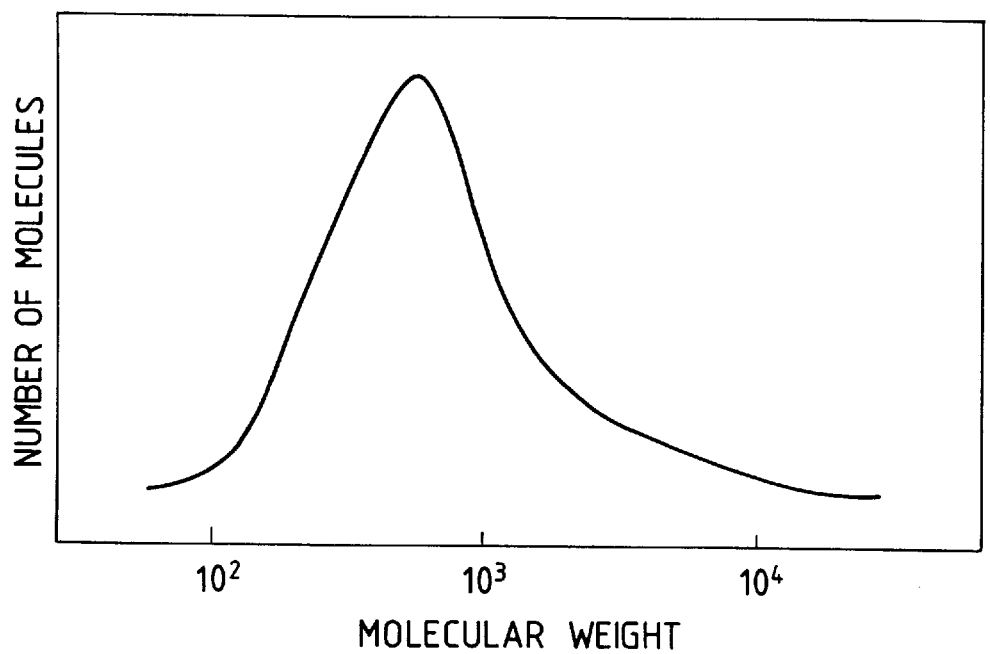
FIG. 12 diagrammatically illustrates a further example of a molecular weight distribution of a liquid composition.
Figure 13:
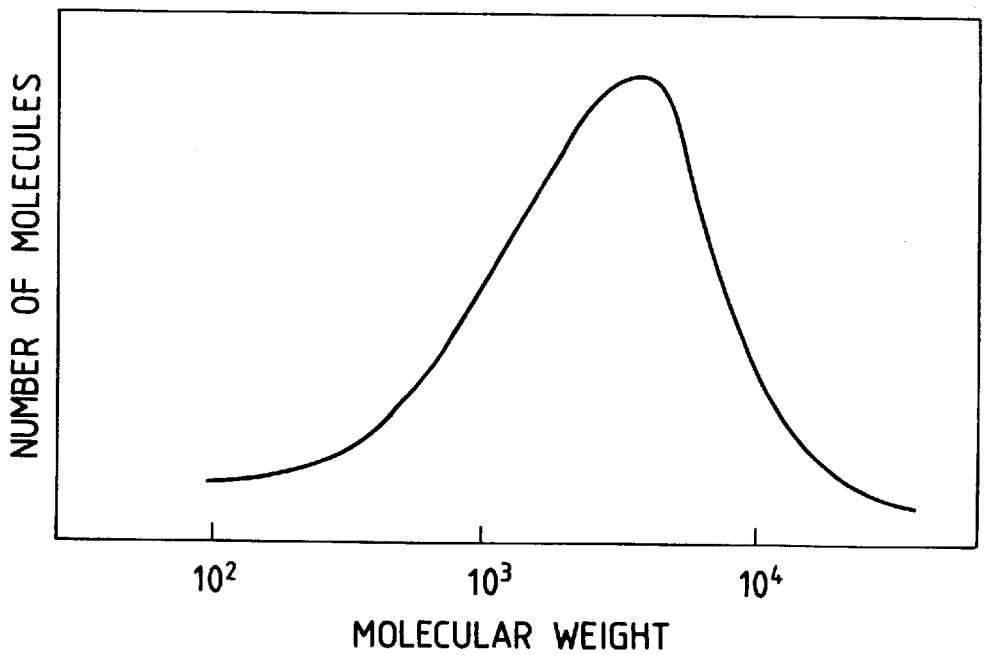
FIG. 13 diagrammatically illustrates a still further example of a molecular weight distribution of a liquid composition.

As the cation-containing liquid composition used in combination with the recording ink, there is preferred a liquid composition having fractions, which each contain a cationic substance, in a molecular weight region of 1,000 or lower and a molecular weight region of higher than 1,000, respectively, when its molecular weight distribution is measured by means of gel permeation chromatography (GPC). As such a liquid composition, for example, those having plural fractions of cationic substances when their molecular weight distributions are measured by GPC are preferred. Examples thereof include liquid compositions in which peaks of the molecular weight distribution separately exist in different molecular weight regions, specifically, in which a peak of the molecular weight distribution exists, for example, in both fractions not higher than 1,000 in terms of molecular weight and higher than 1,000 in terms of molecular weight as illustrated in FIGS. 10 and 11, and the peaks are attributable to cationic substances, and liquid compositions having fractions not higher than 1,000 in terms of molecular weight and higher than 1,000 in terms of molecular weight, respectively, said fractions each containing a cationic substance as illustrated in FIGS. 12 and 13.

When the present invention is performed, it is not necessary to use such a cationic polymeric substance having a high molecular weight as used in the prior art. Since the viscosity of the cation-containing liquid composition is hence not increased, the liquid composition has advantages to ejection properties such as frequency responsiveness, stable ejection volume and stable ejection velocity when it is applied to a recording medium by means of an ink-jet recording head, in particular, an On-Demand type bubble ink-jet recording head. In addition, such advantages that since there is no need to use any polyvalent metal salt, a problem of kagation also does not arise are mentioned as another effect of the present invention.

As described above, the cation-containing liquid composition containing cationic substances of different molecular weights preferably has plural fractions, for example, fractions in a low molecular weight region and a high molecular weight region, said fractions each containing a cationic substance, when its molecular weight distribution is measured by GPC. Examples thereof include liquid compositions in which at least one peak attributable to the cationic substance exists in both low molecular weight region and high molecular weight region as illustrated in FIGS. 10 and 11, liquid compositions which have a single peak and show a wide molecular weight distribution from a low molecular weight region to a high molecular weight region as illustrated in FIGS. 12 and 13 and in which both fractions in the low molecular weight region and the high molecular weight region contain a cationic substance, and liquid compositions which have a single peak and show a wide molecular weight distribution from a low molecular weight region to a high molecular weight region, said molecular weight distribution being continuous from the low molecular weight region to the high molecular weight region.

Figure 10:
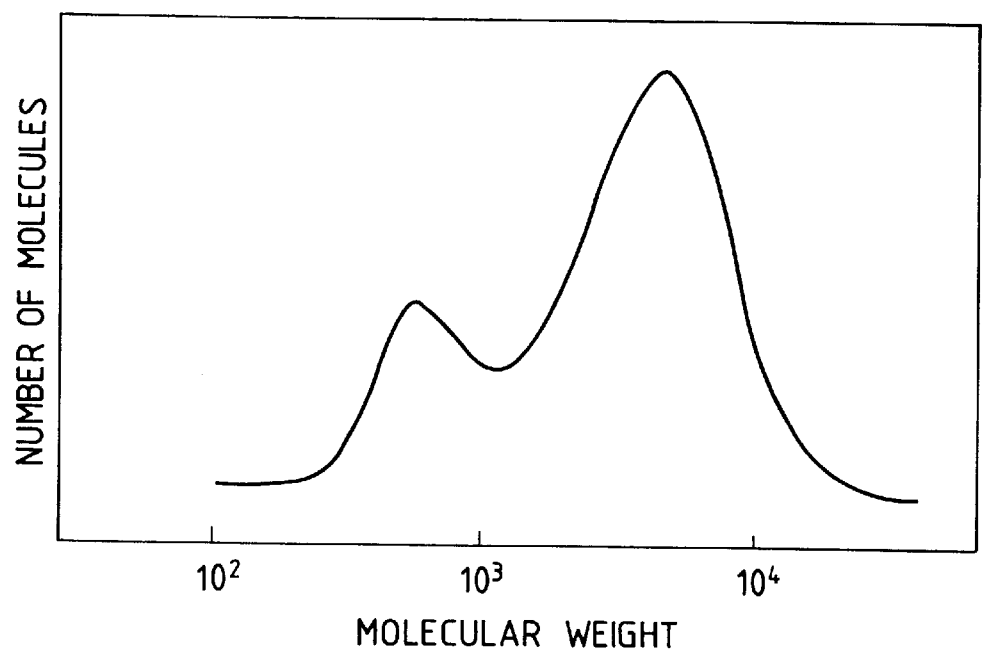
FIG. 10 diagrammatically illustrates an example of a molecular weight distribution of a liquid composition.

In a cation-containing liquid composition having such a molecular weight distribution as illustrated in FIG. 10, the cationic substance contained in the fraction on the low molecular weight side among the plural fractions is preferably a substance contained in a fraction within a molecular weight region of not higher than 1,000, particularly from 200 to 800, more preferably from 300 to 800 in the molecular weight distribution of the liquid composition from the viewpoint of providing a high-quality image.

The reason for it is considered to be due to the fact that an aggregate is rapidly formed at the time a coloring material, for example, a water-soluble dye having an anionic group, and a water-soluble polymeric compound having an alicyclic, nitrogen-containing heterocycle contained in the recording ink come into contact with the cation-containing liquid composition, whereby the mobility of the ink can be quickly restricted, the rebound can be prevented, and the coloring material can be prevented from diffusing and penetrating into a recording medium following the penetration of a solvent into the recording medium.

As the low molecular weight component, a compound close to monodisperse in the molecular weight distribution, for example, that having a peak in a molecular weight region of 1,000 or lower is preferably used. Incidentally, when a substance having no molecular weight distribution is used as the low molecular weight component of the cationic substance, the molecular weight found from its chemical formula is regarded as the position of a peak in the molecular weight distribution.

As specific preferable examples of the low molecular weight component of the cationic substance, may be mentioned compounds of the primary, secondary and tertiary amine salt types, specifically, the hydrochlorides, acetates and the like of laurylamine, coconut amine, stearylamine, rosin amine and the like, and besides compounds of the quaternary ammonium salt type, specifically, lauryltrimethylammonium chloride, lauryldimethylbenzylammonium chloride, benzyltributyl-ammonium chloride, benzalkonium chloride, cetyltrimethyl-ammonium chloride and the like, pyridinium salt type compounds, specifically, cetylpyridinium chloride, cetylpyridinium bromide and the like, imidazoline type cationic compounds, specifically, 2-heptadecenylhydroxy-ethylimidazoline and the like, and ethylene oxide adducts of secondary alkylamines, specifically, dihydroxyethyl-stearylamine and the like.

In the present invention, amphoteric surfactants exhibiting cationic properties in a certain pH region may also be used. More specifically, there are mentioned amino acid type amphoteric surfactants, compounds of the $RNHCH_2$—$CH_2COOH$ type, betaine type compounds, for example, stearyldimethylbetaine and lauryldihydroxyethylbetaine, and the like. If these amphoteric surfactants are used, it goes without saying that the cation-containing liquid composition is preferably adjusted either so as to have a pH not higher than their isoelectric point or so as to reach the pH not higher than the isoelectric point when mixed with the recording ink on a recording medium.

Although the examples of the low molecular weight component of the cationic substance have been mentioned above, it goes without saying that cationic substances usable in the present invention are not always limited to these compounds.

As examples of other low molecular weight components of the cationic substances, may be mentioned monomers and oligomers for cationic high molecular weight components which will be described subsequently.

The high molecular weight component of the cationic substance is preferably a cationic substance contained in a fraction within a molecular weight region of higher than 1,000, particularly not lower than 1,500, more preferably from 1,500 to 10,000 when the molecular weight distribution of the cation-containing liquid composition is measured by GPC, from the viewpoints of fixing the recording ink at high speed and providing a high-quality image.

As the high molecular weight component of the cationic substance, a compound close to monodisperse in the molecular weight distribution, such as that having a peak in a molecular weight region of, for example, 1,500 or higher, is preferably used.

As specific examples of the high molecular weight component of the cationic substance, may be mentioned polyallylamine, polyamine sulfone, polyvinylamine, chitosan, and neutralized products or partially neutralized products of these compounds with an acid such as hydrochloric acid or acetic acid. It goes without saying that the high molecular weight component is not limited to these substances. The effect of these polymeric substances in the practice of the present invention can be sufficiently exhibited so far as they have a molecular weight distribution in which at least one peak exists in a molecular weight region of higher than 1,000, for example, not lower than 1,500 but not higher than 10,000.

Incidentally, the molecular weight of the polymeric substance in the present invention designates an average molecular weight determined by means of GPC and means a weight average molecular weight in terms of polyethylene oxide unless expressly noted.

As specific examples of other cationic polymeric substances usable in the present invention, may be mentioned compounds obtained by partially cationizing a nonionic polymeric substance. Specific examples of such compounds include copolymers of vinylpyrrolidone and an aminoalkylalkylate quaternary salt and copolymers of acrylamide and an aminomethylacrylamide quaternary salt. It goes without saying that the polymeric substance is not limited to these compounds. If the above-described cationic polymeric substances are soluble in water, there is nothing to be said against them. However, they may be in the form of a dispersion such as latex or emulsion.

Cation-containing liquid compositions having such a molecular weight distribution as illustrated in FIGS. 12 and 13 will now be described.

The liquid composition having the molecular weight distribution illustrated in FIG. 12 according to an embodiment of the present invention is such that a peak of its molecular weight distribution exists in a molecular weight region of not higher than 1,000, a fraction is also present in a region of higher than 1,000, and the fractions in the molecular weight region of not higher than 1,000 and the molecular weight region of higher than 1,000 contain a cationic substance. As a cationic substance used in such a cation-containing liquid composition, there may be preferably used a substance the molecular weight of which widely distributes from a low molecular weight region to a high molecular weight region. More specifically, preferred is a cationic compound which provides such a liquid composition that when the molecular weight distribution of this liquid composition is measured, a cationic substance is contained in a fraction not higher than 1,000 in terms of molecular weight, particularly in a fraction of about 800 in terms of molecular weight, or even in a fraction of about 300 in terms of molecular weight on the low molecular weight region, while a cationic substance is contained in a fraction higher than 1,000 in terms of molecular weight, particularly in a fraction not lower than 1,500 in terms of molecular weight, or even in a fraction of from 1,500 to 10,000 in terms of molecular weight on the high molecular weight region. Such a cationic compound may be obtained either from one kind of cationic polydisperse polymer having a single recurring unit or from a mixture of two or more cationic polymers of different structures. Examples of such a cationic substance include polymers which are the same polymers as those used as the high molecular weight component of the cationic substance and synthesized so as to widen its molecular weight distribution, and mixtures of a polymer and an oligomer.

The mixing ratio of the low molecular weight component to the high molecular weight component of the cationic substance in the cation-containing liquid composition may be suitably selected according to the raw materials. For example, when the ratio is determined within a range of from 10:1 to 1:10, preferably from 5:1 to 1:5 by weight, more preferably from 1:1 to 1:5 by weight, the problem of ejection failure due to the rebound of the cation-containing liquid composition, the recording ink or a mixture thereof can be fully solved, and the water fastness of the resulting image can also be more enhanced. In addition, bleeding can be sufficiently prevented, and moreover the edge sharpness of the resulting image can be improved.

The content of the cationic substance in the cation-containing liquid composition may also be suitably determined according to the raw materials so as to exhibit the above-described effects. For example, when the content is determined within a range of from 0.05 to 20% by weight, particularly from 0.5 to 5% by weight based on the total weight of the liquid composition, preference is given from the viewpoint of controlling the physical properties of the cation-containing liquid composition, such as viscosity and surface tension so as to be suited for ink-jet recording.

Other components making up the cation-containing liquid compositions usable in the present invention will hereinafter be described specifically. The cation-containing liquid compositions may contain water, water-soluble organic solvents and other additives in addition to the above-described respective cationic substances. Examples of the water-soluble organic solvents used include amides such as dimethylformamide and dimethylacetoamide; ketones such as acetone; ethers such as tetrahydrofuran and dioxane; polyalkylene glycols such as polyethylene glycol and polypropylene glycol; alkylene glycols such as ethylene glycol, propylene glycol, butylene glycol, triethylene glycol, thiodiglycol, hexylene glycol and diethylene glycol; lower alkyl ethers of polyhydric alcohols, such as ethylene glycol methyl ether, diethylene glycol monomethyl ether and triethylene glycol monomethyl ether; monohydric alcohols such as ethanol, isopropyl alcohol, n-butyl alcohol and isobutyl alcohol; and besides, 1,2,6-hexanetriol, glycerol, N-methyl-2-pyrrolidone, 1,3-dimethylimidazolidinone, triethanolamine, sulfolane and dimethyl sulfoxide.

No particular limitation is imposed on the content of the water-soluble organic solvents. However, it may preferably be within a range of from 5 to 60% by weight, more preferably from 5 to 40% by weight based on the total weight of the cation-containing liquid composition. Besides the above components, additives such as viscosity modifiers, pH adjustors, antiseptics, surfactants, antioxidants and evaporation accelerators may be incorporated as needed. The selection of the surfactants is particularly important from the viewpoint of controlling the penetrability of a liquid.

No particular limitation is imposed on the recording medium used in the practice of the present invention, and the so-called plain paper such as paper for copying and bond paper, which are routinely used, are preferably used. It goes without saying that coated paper specially prepared for ink-jet recording, and transparent films for OHP may also be suitably used, and besides general-purpose wood free paper and glossy paper may also be suitably used.

Any process may be used as the image-forming process in the present invention so far as it is a process in which the cation-containing liquid composition and the recording ink can be coexisted on a recording medium. No problem arises if either of the cation-containing liquid composition and the recording ink is first applied to the recording medium. According to an image-forming process in which the cation-containing liquid composition is first applied to a recording medium, and the recording ink is subsequently applied to the recording medium, however, the rebound-preventing effect can be brought about to an extremely great extent, and excellent image recording can hence be stably conducted.

The term "image-forming region" as used herein means a region of a recording medium, to which dots of the recording ink are applied, while the term "the vicinity of the image-forming region" means an outside region about 1 to 5 dots away from the region to which dots of the recording ink are applied.

As a method of applying the cation-containing liquid composition to the recording medium, there is a method in which the liquid composition is applied to the whole surface of the recording medium by a sprayer, roller or the like. However, it is preferable to conduct the application by an ink-jet system by which the liquid composition can be applied selectively and evenly only to the image-forming region where the recording ink will be applied, and the vicinity of the image-forming region. No particular limitation is imposed on the time required from the time the cation-containing liquid composition is applied to the recording medium up to the time the recording ink is then applied. In order to perform the present invention more effectively, however, it is desirable to apply the recording ink within several seconds, particularly preferably, within 1 second. The same shall apply to the case where the recording ink is first applied to a recording medium, and the cation-containing liquid composition is then applied.

A method of applying the recording ink to the recording medium may also be suitably selected according to the intended image formation. When an ink-jet system is adopted for the application of at least one of the recording ink and the cation-containing liquid composition to the recording medium, various kinds of ink-jet systems may be used. Specific examples thereof include the so-called On-Demand type bubble ink-jet system in which bubbles generated by thermal energy are used to eject droplets, and an ink-jet system using a piezoelectric element. In the present invention, the bubble ink-jet system is particularly preferably used. Namely, when at least a liquid used in the step conducted later between the application step of the recording ink to the recording medium and the application step of the cation-containing liquid composition is applied to the recording medium by means of the bubble ink-jet system, the effect of preventing the rebound of the liquid applied first can be still more enhanced.

With respect to the molecular weight distributions of the cationic substances used in the present invention, the individual cationic substances may be subjected to GPC measurement in advance. Alternatively, the molecular weight distribution may be determined in the following manner. Namely, after the molecular weight distribution of the cation-containing liquid composition itself is determined, a sufficient amount of an ink containing a dye having at least an anionic group is mixed under stirring with the liquid composition in a beaker, and precipitate formed is removed. Thereafter, the GPC measurement is conducted again to compare the measurement results before the mixing of the ink and after the mixing of the ink and the removal of the precipitate with each other, whereby the molecular weight distribution of the cationic substance is found from the molecular weight distribution of the component precipitated by the dye in the ink and removed from the system.

Figure 2:
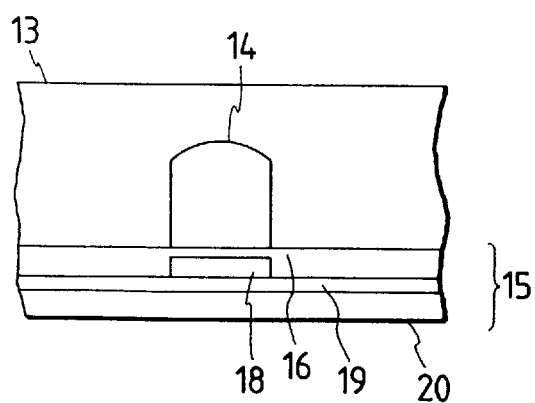
FIG. 2 is a transverse cross-sectional view of the head of the ink-jet recording apparatus.
Figure 3:
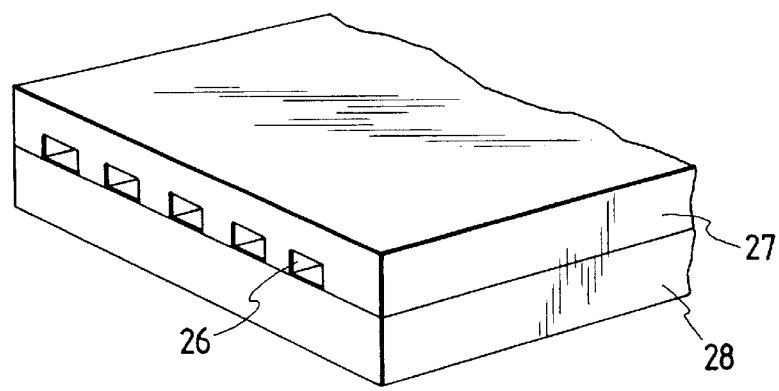
FIG. 3 is a perspective view of the appearance of another head of the ink-jet recording apparatus.

Recording apparatus useful in the practice of the present invention will now be described. In the present invention, the so-called On-Demand type bubble ink-jet system in which a recording signal is applied to a recording ink in a recording head to eject droplets of the ink by the thermal energy generated is preferred. Examples of the construction of a recording head, which is a main component of such an apparatus, are illustrated in FIGS. 1, 2 and 3. A head 13 is formed by bonding a glass, ceramic, plastic plate or the like having an ink-passing channel to a heating head 15, which is used for thermal recording and has a heating resistor (the drawings show a head to which, however, the invention is not limited). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

A recording ink 21 comes up to an ejection orifice 22 and forms a meniscus 23 due to a pressure P. Now, upon application of electric signals to the electrodes 17-1, 17-2, the heating head 15 rapidly generates heat at the region shown by n to form bubbles in the recording ink 21 which is in contact with this region. The meniscus 23 of the ink is projected by the action of the pressure thus produced, and the recording ink 21 is ejected from the orifice 22 to a recording medium 25 in the form of droplets 24 of the recording ink. FIG. 3 schematically illustrates a multi-head composed of an array of a number of heads as shown in FIG. 1. The multi-head is formed by closely bonding a glass plate or the like 27 having a number of channels to a heating head 28 similar to the head as illustrated in FIG. 1. Incidentally, FIG. 1 is a cross-sectional view of the head 13 taken along the flow path of the ink, and FIG. 2 is a cross-sectional view taken along line 2—2 in FIG. 1.

Figure 4:
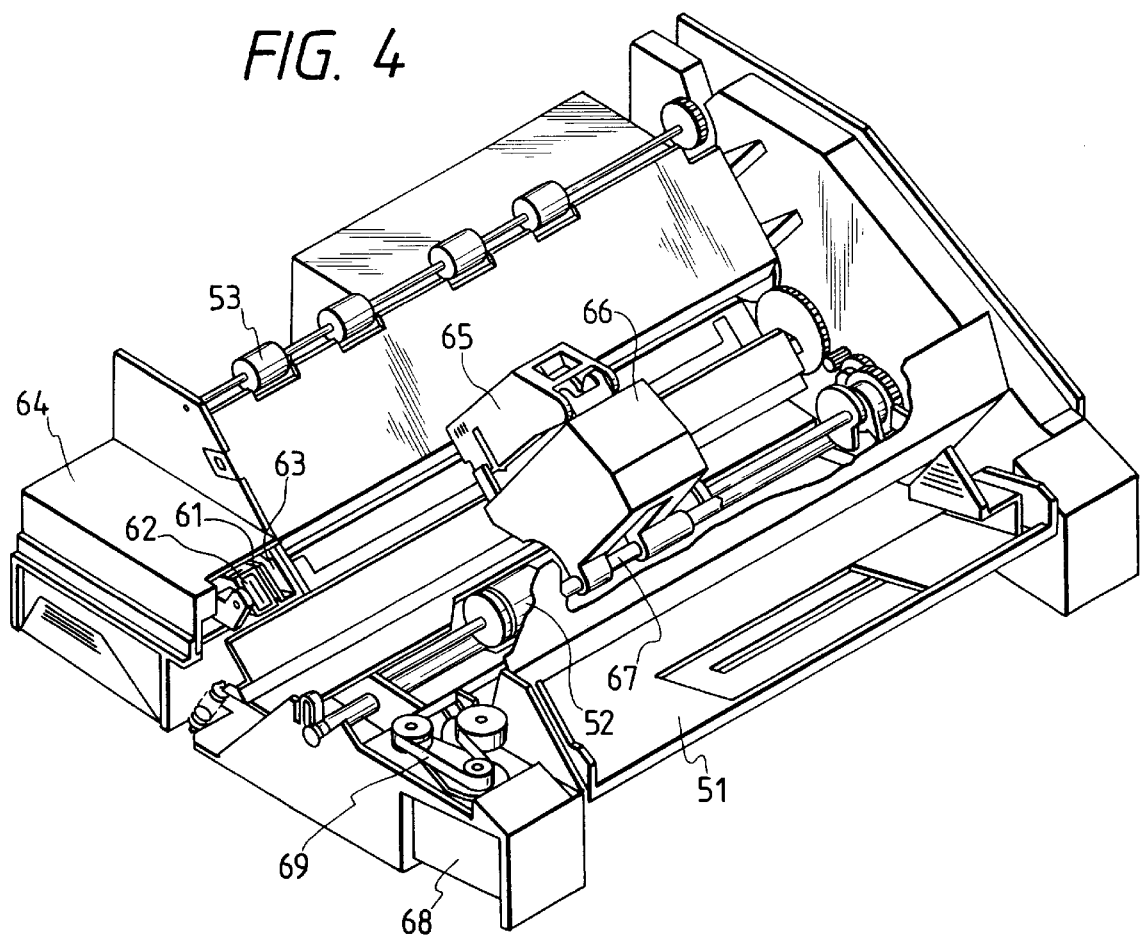
FIG. 4 is a perspective view of an illustrative ink-jet recording apparatus.

FIG. 4 illustrates an exemplary ink-jet recording apparatus in which such a head has been incorporated. In FIG. 4, reference numeral 61 designates a blade serving as a wiping member, one end of which is a stationary end held by a blade-holding member to form a cantilever. The blade 61 is provided at a position adjacent to a region in which a recording head operates, and in this embodiment, is held in such a form that it protrudes into the course through which the recording head is moved. Reference numeral 62 indicates a cap, which is provided at a home position adjacent to the blade 61, and is so constituted that it moves in a direction perpendicular to a direction in which the recording head is moved and comes into contact with the face of ejection openings to cap it. Reference numeral 63 denotes an ink-absorbing member provided adjoiningly to the blade 61 and, similar to the blade 61, held in such a form that it protrudes into the course through which the recording head is moved. The above-described blade 61, cap 62 and absorbing member 63 constitute an ejection-recovery portion 64, where the blade 61 and absorbing member 63 remove water, dust and/or the like from the face of the ink-ejecting openings.

Reference numeral 65 designates the recording head having an ejection-energy-generating means and serving to eject the recording ink onto a recording medium set in an opposing relation to the ejection opening face provided with ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto. Reference numerals 51 and 52 denote a feeding part from which the recording media are separately inserted, and feed rollers driven by a motor (not illustrated), respectively. With such a construction, the recording medium is fed to the position opposite to the ejection opening face of the recording head, and discharged from a discharge section provided with discharge rollers 53 with the progress of recording.

In the above construction, the cap 62 in the head recovery portion 64 is receded from the path of motion of the recording head 65 when the recording head 65 is returned to its home position, for example, after completion of recording, and the blade 61 remains protruded into the path of motion. As a result, the ejection opening face of the recording head 65 is wiped. When the cap 62 comes into contact with the ejection opening face of the recording head 65 to cap it, the cap 62 is moved so as to protrude into the path of motion of the recording head 65. When the recording head 65 is moved from its home position to the position at which recording is started, the cap 62 and the blade 61 are at the same positions as the positions for the wiping as described above. As a result, the ejection opening face of the recording head 65 is also wiped at the time of this movement. The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement.

Figure 5:
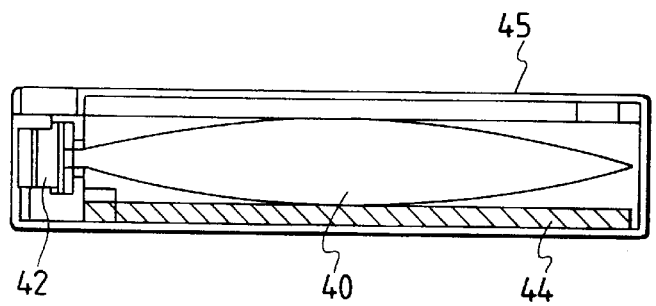
FIG. 5 is a longitudinal cross-sectional view of an ink cartridge.

FIG. 5 illustrates an exemplary ink cartridge 45 in which a recording ink to be fed to the head through an ink-feeding member, for example, a tube is contained. Here, reference numeral 40 designates an ink container part containing the recording ink to be fed, as exemplified by a bag for the ink. One end thereof is provided with a stopper 42 made of rubber. A needle (not illustrated) may be inserted into this stopper 42 so that the recording ink in the bag 40 for the ink can be fed to the head. Reference numeral 44 indicates an ink absorbing member for receiving a waste ink. It is preferable that the ink container part is formed of a polyolefin, in particular, polyethylene, at its surface with which the recording ink comes into contact.

Figure 6:
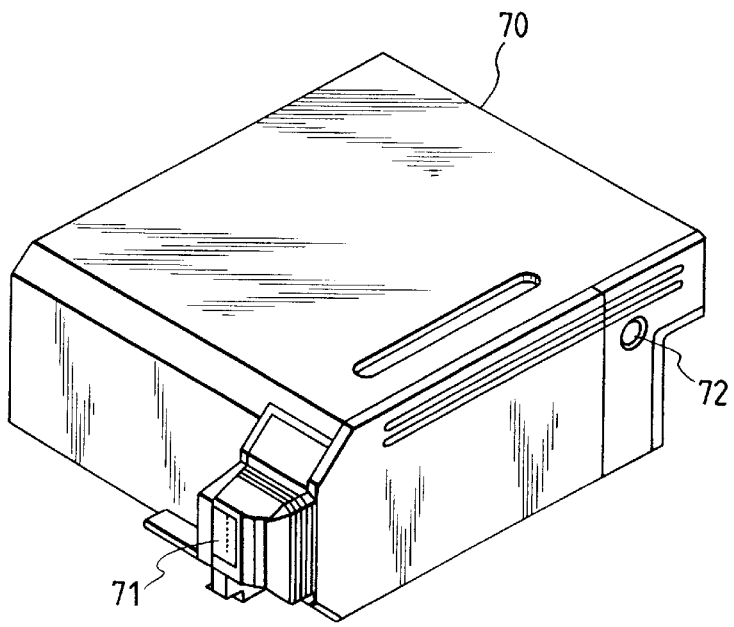
FIG. 6 is a perspective view of a recording unit.

The ink-jet recording apparatus used in the present invention are not limited to the apparatus as described above in which the recording head and the ink cartridge are separately provided. Therefore, a device in which these members are integrally formed as shown in FIG. 6 can also be preferably used. In FIG. 6, reference numeral 70 designates a recording unit, in the interior of which an ink container part containing a recording ink, for example, an ink-absorbing member, is contained. The recording unit 70 is so constructed that the recording ink in such an ink-absorbing member is ejected in the form of ink droplets through a head 71 having a plurality of orifices. For example, polyurethane may be used as a material for the ink-absorbing member. Reference numeral 72 indicates an air passage for communicating the interior of the recording unit 70 with the atmosphere. This recording unit 70 can be used in place of the recording head shown in FIG. 4, and is detachably installed on the carriage 66. Incidentally, in the recording apparatus used in the present invention, the ink-jet recording apparatus in which thermal energy is applied to a recording ink to eject droplets of the recording ink has been described by way of example. However, the present invention can also be used in other ink-jet recording apparatus of a piezo-system using a piezo-electric element than the above apparatus.

Figure 7:
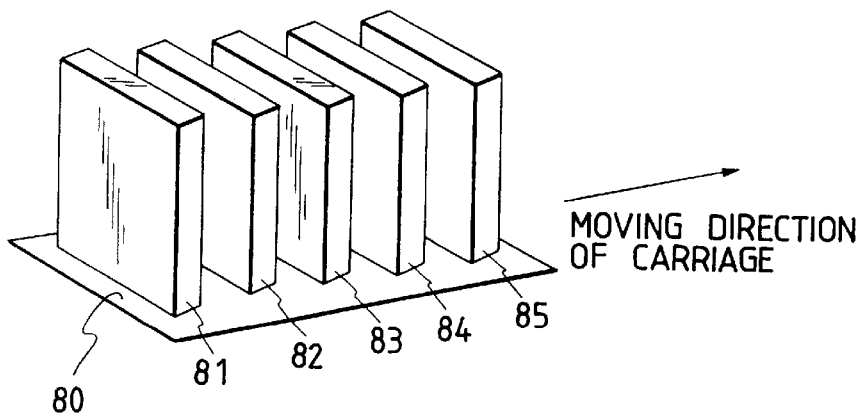
FIG. 7 is a perspective view illustrating a recording part, in which plural recording heads are arranged.

In the case where the image-recording process according to the present invention is carried out, for example, a recording apparatus in which five recording heads, each of which has been illustrated in FIG. 3, are arranged on a carriage 80, can be used. An example thereof is illustrated in FIG. 7. Reference numerals 81, 82, 83 and 84 indicate recording heads for ejecting recording inks of yellow, magenta, cyan and black colors, respectively. Reference numeral 85 designates a head for ejecting the cation-containing liquid composition, which is so constructed that droplets of the liquid composition are ejected by the same ink-jet system as the above-described head used for ejecting the recording ink.

Figure 8:
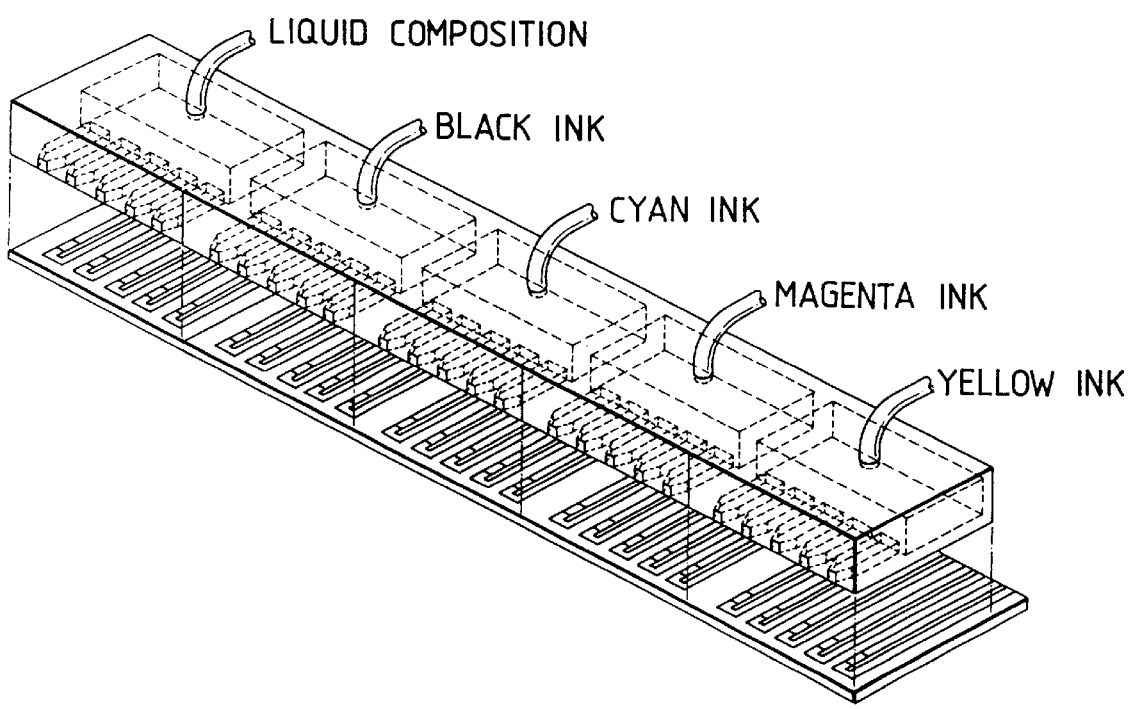
FIG. 8 is a perspective view illustrating another construction of a recording head.

These heads are arranged in the above-described recording apparatus and eject the respective recording inks of the different colors according to recording signals. The cation-containing liquid composition is applied in advance to at least image-forming regions (portions to which the recording inks will be applied) before the application of the recording inks, or applied subsequently to the application of the recording inks. FIG. 7 shows the case where the five recording heads are used. However, the present invention is not limited thereto. Preference is given even to the case where the yellow, magenta, cyan and black inks and the cation-containing liquid composition are ejected from separate flow paths in one recording head as shown in FIG. 8. It goes without saying that construction of the head may be changed so as to reverse the recording order of the cation-containing liquid composition and the recording inks as described above.

The inclusion of the water-soluble polymeric compound having an alicyclic, nitrogen-containing heterocycle in the recording ink brings about, for example, the following excellent effects. In the recording of the two-part liquid system, high-speed fixing is feasible, and images high in print quality, free of bleeding and higher in water fastness can be provided. The staining on the surface of a recording head due to the rebound of liquids at the time a liquid is applied to a recording medium so as to overlap another liquid applied first, in particular, defective ejection and ejection failure of ink due to the crusting of an aggregate on the recording head can be effectively prevented.

The present invention will hereinafter be described more specifically by the following examples and comparative examples. Incidentally, all designations of "part" or "parts" and "%" as will be used in the following examples mean part or parts by weight and % by weight unless expressly noted.

EXAMPLE 1

[Preparation of recording inks and cation-containing liquid compositions]

Their corresponding recording ink components for ink sets shown in Tables 1 to 6 were mixed into solutions, and the resultant solutions were separately filtered under pressure through a membrane filter (Fluoropore Filter, trade name; product of Sumitomo Electric Industries, Ltd.) having a pore size of 0.22 μm, thereby obtaining recording inks [yellow ink (Y), magenta ink (M), cyan ink (C) and black ink (Bk)] for respective ink sets. Incidentally, Dye 1 and Dye 2 in Tables 1 to 6 are those having the following structures, respectively.

Dye 1:

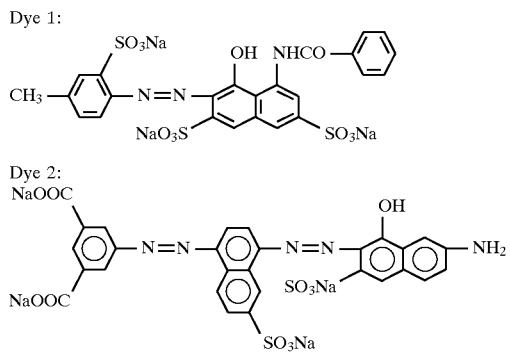

Dye 2:

Dye 1 and Dye 2 can be obtained in accordance with the methods described in Japanese Patent Application Laid-Open Nos. 59-78273 and 3-91577, respectively.

Besides, Polymeric Substances A to F in Tables 1 to 6 are as follows. Incidentally, the molecular weight of each polymeric substance was determined by gel permeation chromatography (GPC column: TSG-gel GMHXL, in terms of polystyrene).

Polymeric Substance A

Molecular weight (Mw): 27,000

Copolymer of the following Monomers A-1 to A-3 (weight ratio A-1:A-2:A-3 among the monomers incorporated=90:8:2)

(1) Monomer A-1

2-Morpholinooxyethyl methacrylate (2) Monomer A-2

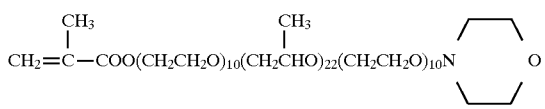

(3) Monomer A-3

Methacrylic acid.

Polymeric Substance B

Molecular weight (Mw): 50,000

Copolymer of the following Monomers B-1 to B-3 (weight ratio B-1:B-2:B-3 among the monomers incorporated=50:48:2)

(1) Monomer B-1

2-Morpholinooxyethyl methacrylate (2) Monomer B-2

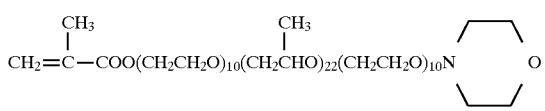

(3) Monomer B-3

Methacrylic acid.

Polymeric Substance C
  Molecular weight (Mw): 15,000
  Copolymer of the following Monomers C-1 to C-3 (weight ratio C-1:C-2:C-3 among the monomers incorporated=90:8:2)
(1) Monomer C-1
  2-Morpholinooxyethyl methacrylate
(2) Monomer C-2

$$CH_2=\underset{\underset{CH_3}{|}}{C}-COO(CH_2CH_2O)_{10}(CH_2CHO)_{22}(CH_2CH_2O)_{10}CH_3$$
(with $CH_3$ on the middle unit)

(3) Monomer C-3
  Methacrylic acid.
Polymeric Substance D
  Molecular weight (Mw): 5,000
  Copolymer of the following Monomers D-1 to D-3 (weight ratio D-1:D-2:D-3 among the monomers incorporated=80:15:5)
(1) Monomer D-1
  2-Morpholinooxybutyl methacrylate
(2) Monomer D-2

$$CH_2=\underset{\underset{CH_3}{|}}{C}-COO(CH_2CH_2O)_{15}(CH_2CHO)_{30}(CH_2CH_2O)_{15}N\diagup\diagdown O$$

(3) Monomer D-3
  Methacrylic acid.
Polymeric Substance E
  Molecular weight (Mw): 10,000
  Copolymer of the following Monomers E-1 to E-3 (weight ratio E-1:E-2:E-3 among the monomers incorporated=80:15:5)
(1) Monomer E-1
  2-Morpholinooxybutyl methacrylate
(2) Monomer E-2

$$CH_2=\underset{\underset{CH_3}{|}}{C}-COO(CH_2CH_2O)_{5}(CH_2CHO)_{15}(CH_2CH_2O)_{5}N\diagup\diagdown O$$

(3) Monomer E-3
  Methacrylic acid.
Polymeric Substance F
  Molecular weight (Mw): 300,000
  Copolymer of the following Monomers F-1 to F-3 (weight ratio F-1:F-2:F-3 among the monomers incorporated=80:15:5)
(1) Monomer F-1
  2-Morpholinooxybutyl methacrylate
(2) Monomer F-2

$$CH_2=\underset{\underset{CH_3}{|}}{C}-COO(CH_2CH_2O)_{10}(CH_2CHO)_{15}(CH_2CH_2O)_{10}N\diagup\diagdown O$$

(3) Monomer F-3
  Methacrylic acid.
  Incidentally, the above-described polymeric substances were obtained in accordance with the following process. Namely, their corresponding three monomers (1), (2) and (3) for preparation of the respective polymeric substances were mixed in the determined weight ratios. Further, 0.1 part of 2,2'-azobis(2,4-dimethyl)-valeronitrile was mixed as a polymerization catalyst with each of the resultant mixtures. The mixture was placed in an ampule, frozen and deaerated, and then hermetically sealed to conduct polymerization at 60° C. for 8 hours, thereby obtaining the intended polymeric substance.

Besides, the monomers (2) (A-2, B-2, D-2, E-2 and F-2) were synthesized in accordance with the following process. Namely, alkylene oxides (ethylene oxide, propylene oxide and the like) were first added successively to a nitrogen-containing alicyclic compound in the presence of an alkali metal catalyst at 50° to 200° C. and 1 to 10 atm, and ethylene oxide was further added to synthesize a polyether monool. The polyether monool was esterified with methacrylic acid or acrylic acid in the presence of an acid catalyst (sulfuric acid, p-toluene-sulfonic acid or the like) at 50° to 200° C. and 1 to 10 atm, or esterified with an esterifying agent (dicyclohexyl carbodiimide) at −10° to 50° C. under atmospheric pressure, thereby obtaining the intended monomer. Incidentally, Monomer C-2 was synthesized in the same manner as in A-2 except that methanol was used in place of the nitrogen-containing compound alicyclic compound.

TABLE 1

Compositions of Ink Set A (%)

| | Kind of ink | | | |
|---|---|---|---|---|
| | Y | M | C | Bk |
| Dyes: | | | | |
| DY142 | 2 | | | |
| Dye 1 | | 3 | | |
| DB199 | | | 2.5 | |
| FB2 | | | | 4 |
| Polymeric Substance A | 2 | 2 | 2 | 2 |
| Glycerol | 5 | 5 | 5 | 5 |
| Thiodiglycol | 5 | 5 | 5 | 5 |
| Ethylene glycol | | | | 5 |
| Isopropyl alcohol | 4 | 4 | 4 | 4 |
| Acetylenol | | | | 0.3 |
| Ion-exchanged water | 82 | 81 | 81.5 | 74.7 |

TABLE 2

Compositions of Ink Set B (%)

| | Kind of ink | | | |
|---|---|---|---|---|
| | Y | M | C | Bk |
| Dyes: | | | | |
| AY23 | 3 | | | |
| AR289 | | 2 | | |
| AB9 | | | 2 | |
| Dye 2 | | | | 4 |
| Polymeric substance B | 3 | 3 | 3 | 3 |
| Glycerol | 5 | 5 | 5 | 5 |
| Ethylene glycol | 5 | 5 | 5 | |
| Acetylenol | 0.3 | 0.3 | 0.3 | |
| Ion-exchanged water | 83.7 | 84.7 | 84.7 | 88 |

TABLE 3

Compositions of Ink Set C (%)

| | Kind of ink | | | |
|---|---|---|---|---|
| | Y | M | C | Bk |
| Dyes: | | | | |
| DY86 | 3 | | | |
| AR52 | | 2 | | |
| DB86 | | | 3 | |
| DB154 | | | | 4 |
| Polymeric Substance C | 5 | 5 | 5 | 2 |
| Glycerol | 5 | 5 | 5 | 5 |
| Diethylene glycol | 5 | 5 | 5 | 5 |
| Ethanol | 4 | 4 | 4 | 4 |
| Ion-exchanged water | 78 | 79 | 78 | 80 |

TABLE 4

Compositions of Ink Set D (%)

| | Kind of ink | | | |
|---|---|---|---|---|
| | Y | M | C | Bk |
| Dyes: | | | | |
| DY142 | 3 | | | |
| Dye 1 | | 3 | | |
| DB199 | | | 2.5 | |
| FB2 | | | | 4 |
| Polymeric Substance D | 2 | 2 | 2 | 2 |
| Glycerol | 5 | 5 | 5 | 5 |
| Thiodiglycol | 5 | 5 | 5 | 5 |
| Isopropyl alcohol | 4 | 4 | 4 | 4 |
| Ion-exchanged water | 81 | 81 | 81.5 | 80 |

TABLE 5

Compositions of Ink Set E (%)

| | Kind of ink | | | |
|---|---|---|---|---|
| | Y | M | C | Bk |
| Dyes: | | | | |
| AY23 | 3 | | | |
| AR289 | | 2 | | |
| AB9 | | | 2 | |
| Dye 2 | | | | 4 |
| Polymeric substance E | 3 | 3 | 3 | 3 |
| Glycerol | 5 | 5 | 5 | 5 |
| Ethylene glycol | 5 | 5 | 5 | 5 |
| Acetylenol | 0.3 | 0.3 | 0.3 | 0.3 |
| Ion-exchanged water | 83.7 | 84.7 | 84.7 | 82.7 |

TABLE 6

Compositions of Ink Set F (%)

| | Kind of ink | | | |
|---|---|---|---|---|
| | Y | M | C | Bk |
| Dyes: | | | | |
| DY86 | 3 | | | |
| AR52 | | 2 | | |
| DB86 | | | 3 | |
| DB154 | | | | 4 |
| Polymeric Substance F | 5 | 5 | 5 | 2 |
| Glycerol | 5 | 5 | 5 | 5 |
| Diethylene glycol | 5 | 5 | 5 | 5 |
| Ethanol | 4 | 4 | 4 | 4 |
| Ion-exchanged water | 78 | 79 | 78 | 80 |

Incidentally, the respective dyes shown in Tables 1 to 6 are as follows:

DY142: C.I. Direct Yellow 142
DB199: C.I. Direct Blue 199
FB2: C.I. Food Black 2
AY23: C.I. Acid Yellow 23
AR289: C.I. Acid Red 289
AB9: C.I. Acid Blue 9
DY86: C.I. Direct Yellow 86
AR52: C.I. Acid Red 52
DB86: C.I. Direct Blue 86
DB154: C.I. Direct Black 154.

Acetylenol is a trade name and available from Kawaken Fine Chemical Co., Ltd.

On the other hand, the following respective components were mixed into solutions, and the resultant solutions were then separately filtered under pressure through a membrane filter (Fluoropore Filter, trade name: product of Sumitomo Electric Industries, Ltd.) having a pore size of 0.22 $\mu$m, thereby obtaining Cation-containing Liquid Compositions X to Z.

| Composition of Liquid Composition X: | |
|---|---|
| Stearyltrimethylammonium chloride (Electrostripper QE, trade name, product of Kao Corporation, Mw: 340) | 2 parts |
| Polyamine sulfone hydrochloride (PAS-A-1, trade name, product of Nitto Boseki Co., Ltd., position of peak in molecular weight distribution: 2,000) | 10 parts |
| Thiodiglycol | 10 parts |
| Ion-exchanged water | 78 parts. |
| Composition of Liquid Composition Y: | |
| Stearyltrimethylammonium chloride (Electrostripper QE, trade name, product of Kao Corporation, Mw: 340) | 2 parts |
| Polyamine sulfone hydrochloride (PAS-A-5, trade name, product of Nitto Boseki Co., Ltd., position of peak in molecular weight distribution: 3,500) | 6 parts |
| Thiodiglycol | 10 parts |
| Ion-exchanged water | 82 parts. |
| Composition of Liquid Composition Z: | |
| Stearyltrimethylammonium chloride (Electrostripper QE, trade name, product of Kao Corporation, Mw: 340) | 2 parts |
| Polyamine sulfone hydrochloride (PAS-92, trade name, product of Nitto Boseki Co., Ltd., position of peak in molecular weight distribution: 5,000) | 4 parts |
| Thiodiglycol | 10 parts |
| Ion-exchanged water | 84 parts. |

EXAMPLE 2

The recording ink sets and cation-containing liquid compositions prepared in Example 1 were used in a recording apparatus using a bubble ink-jet system in accordance with their corresponding printing processes shown in Table 7, thereby conducting recording. The application of the cation-containing liquid composition and the recording ink on a recording medium was performed at a volume ratio of the cation-containing liquid composition to the recording ink of 0.5:1 to 1:1.

TABLE 7

| Printing process No. | Recording ink set | Cation-containing liquid composition | Printing process*) | |
|---|---|---|---|---|
| | | | First ejection | Later ejection |
| 1 | A | X | X | A |
| 2 | B | Y | Y | B |
| 3 | C | Z | Z | C |
| 4 | D | X | D | X |
| 5 | E | Y | E | Y |
| 6 | F | Z | F | Z |

*)A liquid of the first ejection was first ejected, and another liquid of the later ejection was ejected so as to overlap the position of the liquid ejected first.

The images obtained by the recording in accordance with the above respective printing processes were evaluated in accordance with the following methods. The results thus obtained are shown in Table 8.

(1) Image density

A pattern including 5 solid printed areas of 5 mm square was printed on an A4-sized paper sheet with a combination of the liquid composition and the recording ink of black (Bk) in each ink set. After the resultant print sample was left over for at least 30 minutes, optical densities of the individual solid printed areas thereof were measured by a Macbeth reflection densitometer RD915, and their average value was taken as an OD value of the sample and ranked in accordance with the following standard. The shot-in ink quantity of each recording ink in each solid printed area was 12 nl/mm$^2$.

A: OD was not lower than 1.30;

B: OD was not lower than 1.25 but lower than 1.30;

C: OD was lower than 1.25.

(2) Fixing ability

After a solid print image of a red color was formed with the combination of the liquid composition and the recording inks of yellow and magenta in each ink set, another white paper sheet was placed on the recorded image by its own weight, thereby measuring the time required until the recorded image no longer transferred to the back side of the white paper sheet and no greasing occurred assuming that the time the recording was completed was zero. The time measured was used as a measure of the fixing ability to rank it in accordance with the following standard:

A: Shorter than 10 seconds;

B: Not shorter than 10 but shorter than 30 seconds;

C: Not shorter than 30.

(3) Resistance to feathering

Dots were recorded on an A4-sized paper sheet with nozzles of a recording head thinned out every other nozzle. After the thus-obtained print sample was left over for at least 30 minutes, its dots were observed through a magnifier, and the resistance to feathering was ranked in accordance with the following 5-grade standard:

5: Dots were round;

4: Dots underwent feathering or deformation at a quarter of their circumference;

3: Dots underwent feathering or deformation at a half of their circumference;

2: Dots underwent feathering or deformation at three quarters of their circumference;

1: Dots had no round area and the resistance to feathering was hence poor.

(4) Resistance to bleeding

Figure 9:
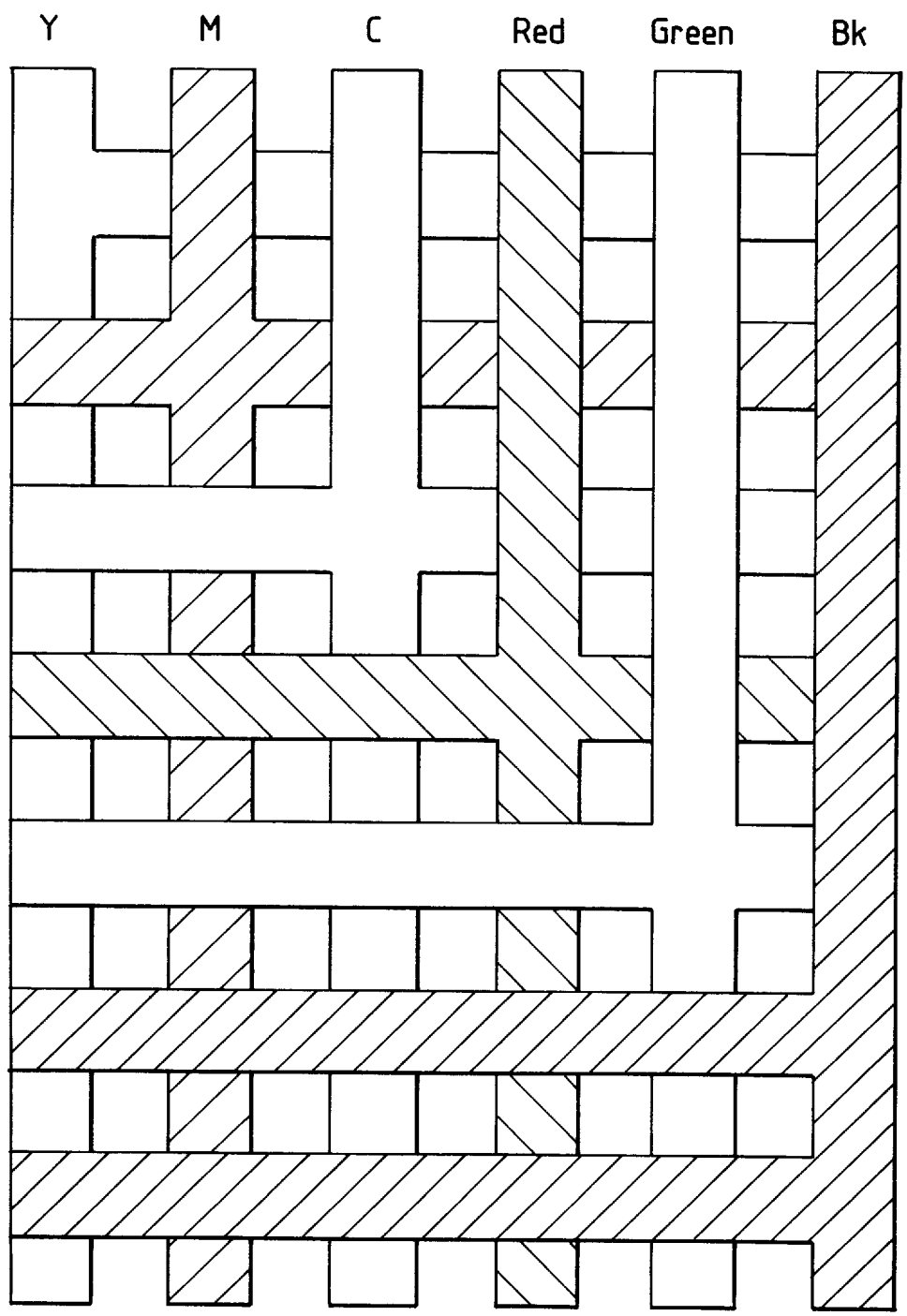
FIG. 9 illustrates a pattern for evaluating bleeding.

A pattern illustrated in FIG. 9 was printed with the combinations of the liquid composition and the yellow, magenta, cyan and black inks in each ink set in accordance with the same printing mode as the printing mode E (1 pass, one-direction printing) in a Bubble Jet Printer BJC-820 (trade name, manufactured by Canon Inc.), thereby visually observing the degree of bleeding (color mixing) at boundaries between the inks of different colors. The resistance to bleeding was ranked in accordance with the following standard:

A: Bleeding scarcely occurred;

B: Bleeding slightly occurred, but no problem arose from the viewpoint of practical use;

C: The level was lower than the above.

(5) Water fastness

After solid print images and English characters and numerals of yellow, magenta, cyan and black colors were printed with the combinations of the liquid composition and the yellow, magenta, cyan and black inks in each ink set, and the resulting print samples were left over for 1 hour, they were immersed for 10 seconds in tap water of 20° C. Thereafter, they were taken out of the water and air-dried as they are, thereby visually evaluating the print samples as to water fastness and ranking it in accordance with the following standard:

A: No ink (dye) running toward the blank portion of the recording medium occurred, greasing was scarcely recognized, and blurring of the English characters and numerals also scarcely occurred;

B: Dye running toward the blank portion of the recording medium slightly occurred, and the English characters and numerals were somewhat blurred, but no problem arose from the viewpoint of practical use;

C: Dye running toward the blank portion of the recording medium occurred to a significant extent, greasing was markedly recognized, and marked blurring of the English characters and numerals also occurred.

Incidentally, the lowest result among the results with the yellow, magenta, cyan and black inks was shown in Table 8.

(6) Level of occurrence of ejection failure

Printing was continuously conducted throughout on a number of sheets of A4-sized paper with the combinations of the liquid composition and the yellow, magenta, cyan and black inks in each ink set under conditions of a volume ratio of the recording ink to the cation-containing liquid composition of 1:1 while conducting recovery operation by wiping a recording head of the recording apparatus as needed, thereby evaluating the level of occurrence of ejection failure and ranking it in accordance with the following standard:

A: Continuous printing was feasible without any wiping operation;

B: Ejection failure intermittently occurred, but normal printing was recovered by wiping operation on all such occasions;

C: Ejection failure occurred, and normal printing could not be recovered even by wiping operation.

TABLE 8

| Pri'g pro- cess No. | Image den- sity | Fixing abil- ity | Feath- ering | Bleed- ing | Water fast- ness | Ejection failure | | | |
|---|---|---|---|---|---|---|---|---|---|
| | | | | | | Y | M | C | Bk |
| 1 | A | A | 5 | A | B | A | A | A | A |
| 2 | A | A | 5 | A | B | A | A | A | A |
| 3 | A | A | 5 | A | A | A | A | A | A |
| 4 | A | A | 4 | A | B | B | B | B | B |
| 5 | A | A | 4 | A | A | B | B | B | B |
| 6 | A | A | 5 | A | A | B | B | B | B |

Comparative Example 1

Using recording ink sets respectively having the same compositions as those in Ink Sets A and B of Example 1 except that Polymeric Substance A or B were not added, the same printing tests as Printing process Nos. 1 and 2 of Example 2 were conducted. Further, a recording ink set having the same composition as that in Ink Set C except that Polymeric Substance C was changed to polyethylene glycol having a weight average molecular weight of 15,000 was used to conduct a printing test under the same conditions as those of Printing process No. 3 of Example 2. As a result, in each of the printing tests, ejection failure occurred during continuous printing on a number of sheets of paper in the ejection failure test, and normal printing could not be recovered even by wiping operation.

While the present invention has been described

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. A recording ink suitable for use in image recording together with a liquid composition containing a cationic substance, wherein the recording ink comprises a coloring material and a water-soluble polymeric compound which exhibits nonionic properties in the ink and has an alicyclic, nitrogen-containing heterocycle, wherein the water-soluble polymeric compound is a water-soluble polymeric compound having a repeating unit represented by the general formula

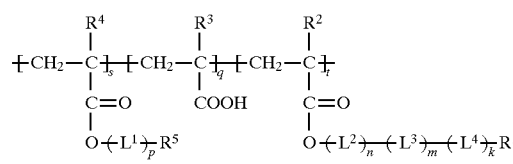

(1)

wherein $R^1$ is hydrogen, a methyl group, an ethyl group or $R^5$, where $R^5$ is one of the alicyclic, nitrogen-containing heterocycles of the formulae

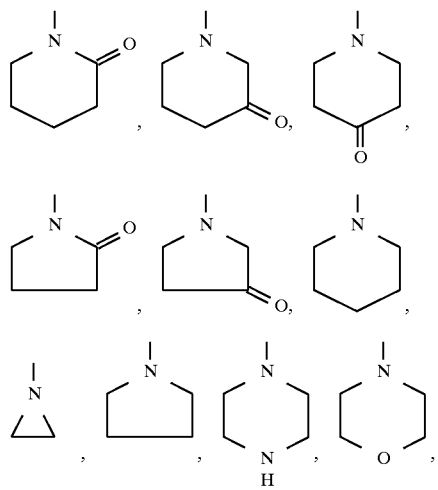

$R^2$ to $R^4$ are, independently of one another, hydrogen or an alkyl group having 1 to 3 carbon atoms, $L^1$ to $L^4$ are, independently of one another, a divalent group having a structure represented by —A—O— (—A— is an alkylene group having 2 to 4 carbon atoms, which may be substituted by a methyl or ethyl group), s, t and q are proportions of copolymerization, the sum of s and t is 90 to 99% by weight, q is 1 to 10% by weight, n and k are integers the sum of which ranges from 10 to 30, m is an integer of 15 to 30, and p is an integer of 1 to 5.

2. The recording ink according to claim 1, wherein the water-soluble polymeric compound can form an aggregate with the liquid composition in the presence of the coloring material.

3. The recording ink according to claim 1, wherein the coloring material is an anionic dye.

4. The recording ink according to claim 1, wherein the water-soluble polymeric compound is a copolymer of (a) an acrylic ester of an ethylene oxide or propylene oxide adduct of a substituted morpholine, (b) acrylic acid and (c) a compound represented by the general formula

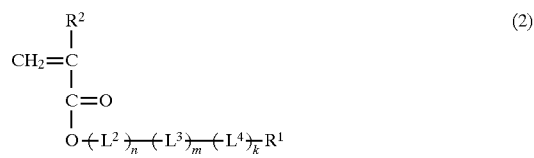

(2)

wherein $R^1$, $R^2$, $L^2$ to $L^4$, n, m and k have the same meaning as defined in the general formula (1).

5. The recording ink according to claim 1, wherein the water-soluble polymeric compound is a water-soluble polymeric compound having a repeating unit represented by the general formula

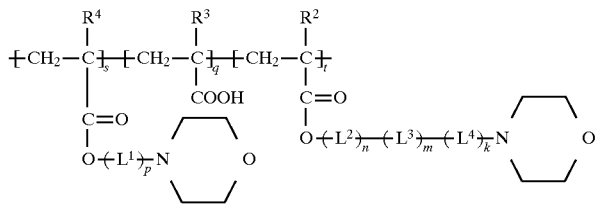

(3)

wherein $R^2$ to $R^4$, $L^1$ to $L^4$, k, n, m, p, q, s and t have the same meaning as defined in the general formula (1).

6. The recording ink according to claim 1, wherein the water-soluble polymeric compound has a molecular weight of from 5,000 to 300,000 as determined by gel permeation chromatography.

7. The recording ink according to claim 6, wherein the water-soluble polymeric compound has a molecular weight of from 5,000 to 50,000 as determined by gel permeation chromatography.

8. The recording ink according to claim 1, which is suitable for use in ink-jet.

9. A process of recording an image by using a liquid composition containing a cationic substance and the recording ink according to claim 1 in combination to record an image on an image-forming region of a recording medium, which the process comprises the steps of:
(A) applying the liquid composition to at least the image-forming region of the recording medium; and
(B) applying the recording ink to the image-forming region.

10. The image-recording process according to claim 9, wherein the recording ink is applied onto the liquid composition applied to the recording medium.

11. The image-recording process according to claim 9, wherein the liquid composition is applied onto the recording ink applied to the recording medium.

12. The image-recording process according to claim 9, wherein the application of at least one of the recording ink and the liquid composition to the recording medium is conducted by an ink-jet system.

13. The image-recording process according to claim 12, wherein the ink-jet system is an On-Demand type ink-jet system.

14. The image-recording process according to claim 12, wherein the ink-jet system is an ink-jet system in which thermal energy is applied to said at least one liquid to apply the liquid to the recording medium.

15. An ink set comprising in combination:
i) a liquid composition containing a cationic substance; and
ii) the recording ink according to claim 1 comprising a coloring material and a water-soluble polymeric compound which exhibits nonionic properties in the ink and has an alicyclic, nitrogen-containing heterocycle,
wherein the recording ink is a color ink using, as the coloring material, a coloring material for yellow, magenta, cyan, black, red, blue or green, and at least one ink of these color inks is combined with the liquid composition.

16. The ink set according to claim 15, wherein three inks of yellow, magenta and cyan colors are combined as the color inks with the liquid composition.

17. The ink set according to claim 15, wherein four inks of yellow, magenta, cyan and black colors are combined as the color inks with the liquid composition.

18. An image-recording apparatus comprising:
a first recording unit equipped with a recording ink-containing part which contains the recording ink according to claim 1 and a recording ink-applying means for applying the recording ink to a recording medium; and
a second recording unit equipped with a liquid composition-containing part which contains a liquid composition containing a cationic substance and a liquid composition-applying means for applying the liquid composition to the recording medium.

19. The image-recording apparatus according to claim 18, wherein at least one of the recording ink-applying means and the liquid composition-applying means is a means according to an ink-jet system.

20. An ink container comprising an ink-containing part which contains an ink, wherein the recording ink according to claim 1 is contained as said ink in the ink-containing part.

21. A recording unit comprising a recording ink-containing part which contains the recording ink according to claim 1 and a recording ink-applying means for applying the recording ink to a recording medium.

22. A recording ink suitable for use in a process of recording an image by applying an ink to a recording medium together with a liquid composition containing a cationic substance by means of an ink-jet system to form a pixel for the image,
wherein the recording ink comprises a coloring material and a water-soluble polymeric compound,
wherein the water-soluble polymeric compound is a water-soluble polymeric compound having a repeating unit represented by the general formula

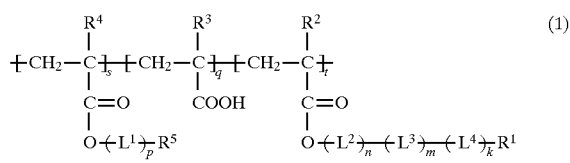

(1)

wherein $R^1$ is hydrogen, a methyl group, an ethyl group or $R^5$, where $R^5$ is one of the alicyclic, nitrogen-containing heterocycles of the formulae

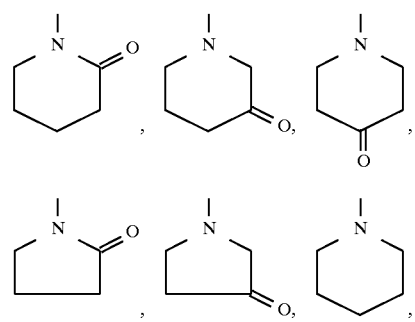

-continued

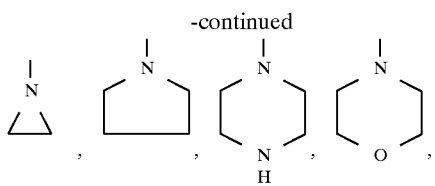

$R^2$ to $R^4$ are, independently of one another, hydrogen or an alkyl group having 1 to 3 carbon atoms, $L^1$ to $L^4$ are, independently of one another, a divalent group having a structure represented by —A—O— (—A— is an alkylene group having 2 to 4 carbon atoms, which may be substituted by a methyl or ethyl group), s, t and q are proportions of copolymerization, the sum of s and t is 90 to 99% by weight, q is 1 to 10% by weight, n and k are integers the sum of which ranges from 10 to 30, m is an integer of 15 to 30, and p is an integer of 1 to 5, and wherein the recording ink provides substantially no attachment of the liquid composition toopenine of an ejection opening for the recording ink when applying the recording ink onto the liquid composition provided on the recording medium, even under conditions that the liquid composition is attached to the face of an ejection opening for recording ink due to a splash of the liquid composition generated by an impact of an application of a recording ink containing no water-soluble polymeric compound onto the liquid composition provided on the recording medium.

23. The recording ink according to claim 22, wherein the water-soluble polymeric compound is a copolymer of (a) an acrylic ester of an ethylene oxide or propylene oxide adduct of a substituted morpholine, (b) acrylic acid and (c) a compound represented by the general formula

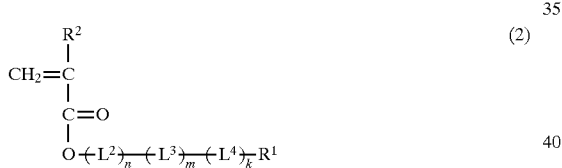

wherein $R^1$, $R^2$, $L^2$ to $L^4$, n, m and k have the same meaning as defined in the general formula (1).

24. The recording ink according to claim 22, wherein the water-soluble polymeric compound is a water-soluble polymeric compound having a repeating unit represented by the general formula

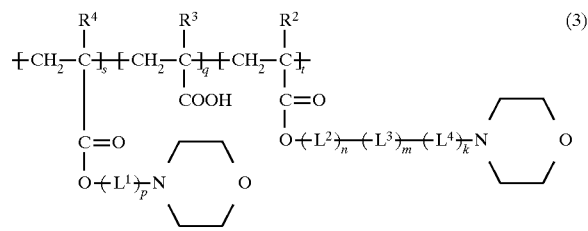

wherein $R^2$ to $R^4$, $L^1$ to $L^4$, k, n, m, p, q, s and t have the same meaning as defined in the general formula (1).

25. The recording ink according to claim 22, wherein the water-soluble polymeric compound has a molecular weight of from 5,000 to 300,000 as determined by gel permeation chromatography.

26. The recording ink according to claim 25, wherein the water-soluble polymeric compound has a molecular weight of from 5,000 to 50,000 as determined by gel permeation chromatography.

27. An ink-jet recording process for recording an image by using a recording ink and a liquid composition containing a cationic substance in combination, comprising the steps of:

(A) applying the liquid composition to at least an image-forming region of a recording medium; and (B) applying the recording ink to the image-forming region of the recording medium, wherein the recording ink comprises a coloring material and a water-soluble polymeric compound, and wherein the recording ink substantially prevents the liquid composition from attaching to a face of an ejection opening for recording ink when applying the recording ink onto the liquid composition on the recording medium, even under conditions that when a recording ink containing no water-soluble polymeric compound is applied onto the liquid composition applied to the recording medium, a splash is generated from the liquid composition on the recording medium due to impact of the application and attached to the face of an ejection opening for recording ink.

28. An image-recording apparatus comprising:

a first recording unit equipped with a recording ink-containing part which contains the recording ink according to claim 22 and a recording ink-applying means for applying the recording ink to a recording medium; and a second recording unit equipped with a liquid composition-containing part which contains a liquid composition containing a cationic substance and a liquid composition-applying means for applying the liquid composition to the recording medium.

29. An ink set comprising in combination:

i) a liquid composition containing a cationic substance; and ii) the recording ink according to claim 22, wherein the recording ink is a color ink using, as the coloring material, a coloring material for yellow, magenta, cyan, black, red, blue or green, and at least one ink of these color inks is combined with the liquid composition.

30. An ink container comprising an ink-containing part, wherein the recording ink according to claim 22 is contained as said ink in the ink-containing part.

31. A recording unit comprising a recording ink-containing part which contains the recording ink according to claim 22 and a recording ink-applying means for applying the recording ink to a recording medium.

32. A recording ink suitable for use in image recording using a bubble ink-jet system together with a liquid composition containing a cationic substance, wherein the recording ink comprises a coloring material and a water-soluble polymeric compound which exhibits nonionic properties in the ink and has an alicyclic, nitrogen-containing heterocycle, and wherein the water-soluble polymeric compound is a water-soluble polymeric compound having a repeating unit represented by the general formula

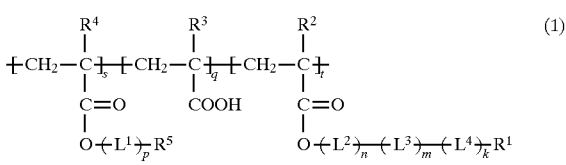

wherein $R^1$ is hydrogen, a methyl group, an ethyl group or $R^5$, where $R^5$ is one of the alicyclic, nitrogen-containing heterocycles of the formulae

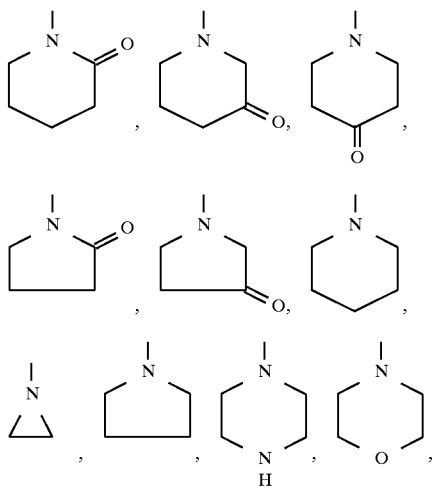

$R^2$ to $R^4$ are, independently of one another, hydrogen or an alkyl group having 1 to 3 carbon atoms, $L^1$ to $L^4$ are, independently of one another, a divalent group having a structure represented by —A—O— (—A— is an alkylene group having 2 to 4 carbon atoms, which may be substituted by a methyl or ethyl group), s, t and q are proportions of copolymerization, the sum of s and t is 90 to 99% by weight, q is 1 to 10% by weight, n and k are integers the sum of which ranges from 10 to 30, m is an integer of 15 to 30, and p is an integer of 1 to 5.

33. The recording ink according to claim 32, wherein the water-soluble polymeric compound is a copolymer of (a) an acrylic ester of an ethylene oxide or propylene oxide adduct of a substituted morpholine, (b) acrylic acid and (c) a compound represented by the general formula

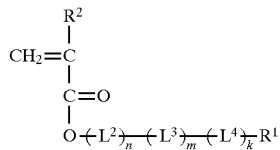
(2)

wherein $R^1$, $R^2$, $L^2$ to $L^4$, n, m and k have the same meaning as defined in the general formula (1).

34. The recording ink according to claim 32, wherein the water-soluble polymeric compound is a water-soluble polymeric compound having a repeating unit represented by the general formula

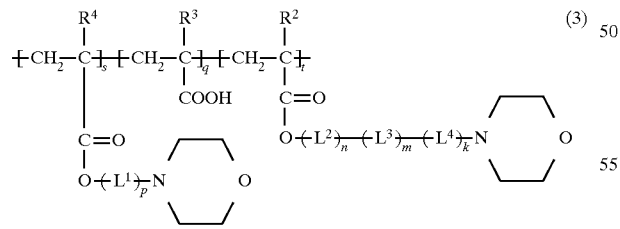
(3)

wherein $R^2$ to $R^4$, $L^1$ to $L^4$, k, n, m, p, q, s and t have the same meaning as defined in the general formula (1).

35. The recording ink according to claim 32, wherein the water-soluble polymeric compound has a molecular weight of from 5,000 to 300,000 as determined by gel permeation chromatography.

36. The recording ink according to claim 35, wherein the water-soluble polymeric compound has a molecular weight of from 5,000 to 50,000 as determined by gel permeation chromatography.

37. A process of recording an image by using a recording ink comprising a water-soluble polymeric compound having an alicyclic, nitrogen-containing heterocycle and a coloring material, and a liquid composition containing a cationic substance, which the process comprises the steps of:

(A) applying the liquid composition to at least an image-forming region of a recording medium; and (B) applying the recording ink to the image-forming region of the recording medium, wherein at least a later step of the steps (A) and (B) comprises a step of applying a liquid to the recording medium by means of a bubble ink-jet system.

38. An image-recording apparatus comprising:

a first unit equipped with a recording ink-containing part which contains the recording ink according to claim 32 and a recording ink-applying means for applying the recording ink to a recording medium; and a second unit equipped with a liquid composition-containing part which contains a liquid composition containing a cationic substance and a liquid composition-applying means for applying the liquid composition to the recording medium, wherein at least one of the recording ink-applying means and the liquid composition-applying means is a means for applying a liquid to the recording medium by means of a bubble ink-jet system.

39. A recording ink suitable for use in image recording together with a liquid composition having fractions not higher than 1,000 in terms of molecular weight and higher than 1,000 in terms of molecular weight, respectively, when its molecular weight distribution is measured by means of gel permeation chromatography (GPC), said fractions not higher than 1,000 in terms of molecular weight and higher than 1,000 in terms of molecular weight each containing a cationic substance, wherein the recording ink comprises an anionic coloring matter and a water-soluble polymeric compound which has an alicyclic, nitrogen-containing heterocycle and exhibits nonionic properties in a liquid, wherein the water-soluble Polymeric compound is a water-soluble polymeric compound having a repeating unit represented by the general formula

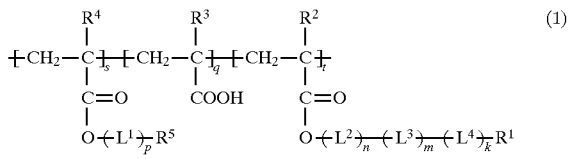
(1)

wherein $R^1$ is hydrogen, a methyl group, an ethyl group or $R^5$, where $R^5$ is one of the alicyclic, nitrogen-containing heterocycles of the formulae

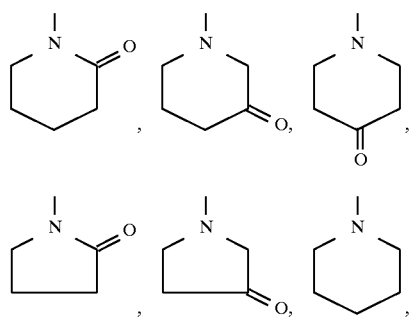

-continued

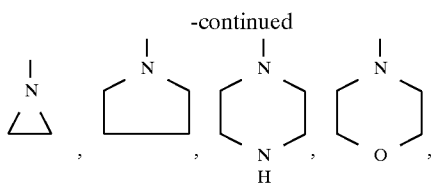

$R^2$ to $R^4$ are, independently of one another, hydrogen or an alkyl group having 1 to 3 carbon atoms, $L^1$ to $L^4$ are, independently of one another, a divalent group having a structure represented by —A—O— (—A— is an alkylene group having 2 to 4 carbon atoms, which may be substituted by a methyl or ethyl group), s, t and q are proportions of copolymerization, the sum of s and t is 90 to 99% by weight, q is 1 to 10% by weight, n and k are integers the sum of which ranges from 10 to 30, m is an integer of 15 to 30, and p is an integer of 1 to 5.

40. The recording ink according to claim 39, wherein the water-soluble polymeric compound forms an aggregate in contact with the liquid composition in the presence of the anionic coloring matter.

41. The recording ink according to claim 39, wherein the water-soluble polymeric compound is a terpolymer of (a) an acrylic ester of an ethylene oxide or propylene oxide adduct of a substituted morpholine, (b) acrylic acid and (c) a compound represented by the general formula

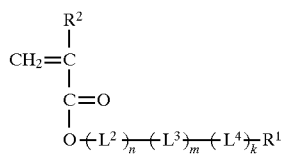

wherein $R^1$, $R^2$, $L^2$ to $L^4$, n, m and k have the same meaning as defined in the general formula (1).

42. The recording ink according to claim 39, wherein the water-soluble polymeric compound is a water-soluble polymeric compound having a repeating unit represented by the general formula

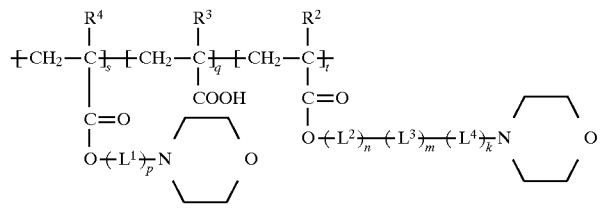

wherein $R^2$ to $R^4$, $L^1$ to $L^4$, k, n, m, p, q, s and t have the same meaning as defined in the general formula (1).

43. The recording ink according to claim 39, wherein the water-soluble polymeric compound has a molecular weight of from 5,000 to 300,000 as determined by gel permeation chromatography.

44. The recording ink according to claim 43, wherein the water-soluble polymeric compound has a molecular weight of from 5,000 to 50,000 as determined by gel permeation chromatography.

45. A process of recording an image by using a recording ink comprising a water-soluble polymeric compound, which has an alicyclic, nitrogen-containing heterocycle and exhibits nonionic properties in a liquid, and an anionic coloring matter, and a liquid composition having fractions not higher than 1,000 in terms of molecular weight and higher than 1,000 in terms of molecular weight, respectively, when its molecular weight distribution is measured by means of gel permeation chromatography (GPC), said fractions not higher than 1,000 in terms of molecular weight and higher than 1,000 in terms of molecular weight each containing a cationic substance, which the process comprises the steps of:

(A) applying the liquid composition to at least an image-forming region of a recording medium; and
(B) applying the recording ink to the image-forming region of the recording medium.

46. The image-recording process according to claim 45, wherein the recording ink is applied onto the liquid composition applied to the recording medium.

47. The image-recording process according to claim 45, wherein the liquid composition is applied onto the recording ink applied to the recording medium.

48. The image-recording process according to claim 45, wherein the application of the recording ink to the recording medium is conducted by an ink-jet system.

49. The image-recording process according to claim 48, wherein the ink-jet system is an On-Demand type ink-jet system.

50. The image-recording process according to claim 49, wherein the ink-jet system is an ink-jet system in which thermal energy is applied to the recording ink to move the recording ink toward the recording medium.

51. The image-recording process according to claim 45, wherein the application of the liquid composition to the recording medium is conducted by an ink-jet system.

52. The image-recording process according to claim 51, wherein the ink-jet system is an On-Demand type ink-jet system.

53. The image-recording process according to claim 52, wherein the ink-jet system is an ink-jet system in which thermal energy is applied to the liquid composition to move the liquid composition toward the recording medium.

54. An ink set comprising in combination:
a liquid composition having fractions not higher than 1,000 in terms of molecular weight and higher than 1,000 in terms of molecular weight, respectively, when its molecular weight distribution is measured by means of gel permeation chromatography (GPC), said fractions not higher than 1,000 in terms of molecular weight and higher than 1,000 in terms of molecular weight each containing a cationic substance; and
at least one recording ink of recording inks of yellow, magenta, cyan, black, red, blue and green, wherein the recording ink comprises a water-soluble polymeric compound, which has an alicyclic, nitrogen-containing heterocycle and exhibits nonionic properties in a liquid, and an anionic coloring matter.

55. The ink set according to claim 54, wherein the recording inks of yellow, magenta and cyan are combined with the liquid composition, and the recording inks each comprise a water-soluble polymeric compound having an alicyclic, nitrogen-containing heterocycle, and an anionic coloring matter.

56. The ink set according to claim 54, wherein the recording inks of yellow, magenta, cyan and black are combined with the liquid composition, and the recording inks each comprise a water-soluble polymeric compound having an alicyclic, nitrogen-containing heterocycle, and an anionic coloring matter.

57. The ink set according to claim 54, wherein the water-soluble polymeric compound forms an aggregate in contact with the liquid composition in the presence of the anionic coloring matter.

58. The ink set according to claim 54, wherein the water-soluble polymeric compound has a carboxyl group.

59. The ink set according to claim 58, wherein the water-soluble polymeric compound is a water-soluble polymeric compound having a repeating unit represented by the general formula

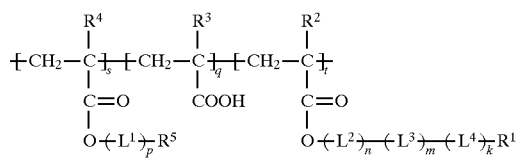

wherein $R^1$ is hydrogen, a methyl group, an ethyl group or $R^5$, where $R^5$ is one of the alicyclic, nitrogen-containing heterocycles of the formulae

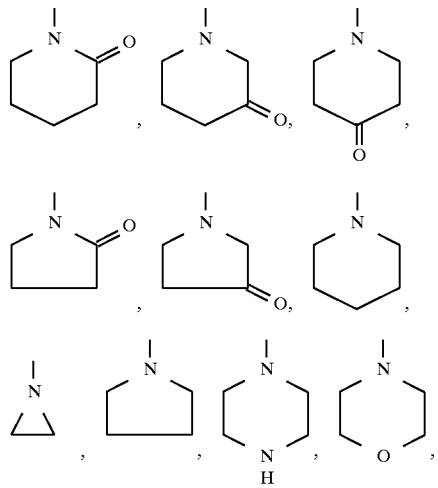

$R^2$ to $R^4$ are, independently of one another, hydrogen or an alkyl group having 1 to 3 carbon atoms, $L^1$ to $L^4$ are, independently of one another, a divalent group having a structure represented by —A—O— (—A— is an alkylene group having 2 to 4 carbon atoms, which may be substituted by a methyl or ethyl group), s, t and q are proportions of copolymerization, the sum of s and t is 90 to 99% by weight, q is 1 to 10% by weight, n and k are integers the sum of which ranges from 10 to 30, m is an integer of 15 to 30, and p is an integer of 1 to 5.

60. The ink set according to claim 59, wherein the water-soluble polymeric compound is a terpolymer of (a) an acrylic ester of an ethylene oxide or propylene oxide adduct of a substituted morpholine, (b) acrylic acid and (c) a compound represented by the general formula

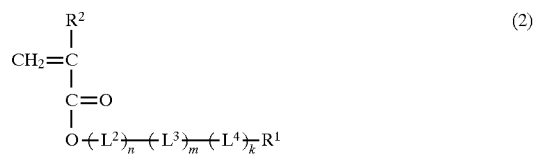

wherein $R^1$, $R^2$, $L^2$ to $L^4$, n, m and k have the same meaning as defined in the general formula (1).

61. The ink set according to claim 59, wherein the water-soluble polymeric compound is a water-soluble polymeric compound having a repeating unit represented by the general formula

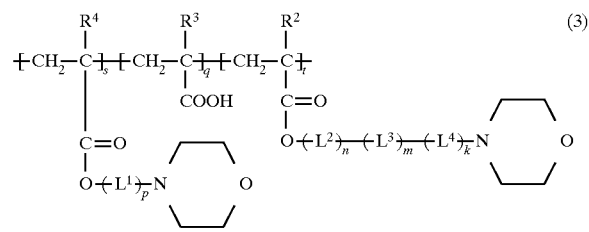

wherein $R^2$ to $R^4$, $L^1$ to $L^4$, k, n, m, p, q, s and t have the same meaning as defined in the general formula (1).

62. The ink set according to claim 59, wherein the water-soluble polymeric compound has a molecular weight of from 5,000 to 300,000 as determined by gel permeation chromatography.

63. The ink set according to claim 62, wherein the water-soluble polymeric compound has a molecular weight of from 5,000 to 50,000 as determined by gel permeation chromatography.

64. An image-recording apparatus comprising:
a first recording unit equipped with a container part which contains a recording ink comprising a water-soluble polymeric compound, which has an alicyclic, nitrogen-containing heterocycle and exhibits nonionic properties in a liquid, and an anionic coloring matter, and a means for applying the recording ink to a recording medium; and
a second recording unit equipped with a container part which contains a liquid composition having fractions not higher than 1,000 in terms of molecular weight and higher than 1,000 in terms of molecular weight, respectively, when its molecular weight distribution is measured by means of gel permeation chromatography (GPC), said fractions not higher than 1,000 in terms of molecular weight and higher than 1,000 in terms of molecular weight each containing a cationic substance, and a means for applying the liquid composition to the recording medium.

65. The image-recording apparatus according to claim 64, wherein at least one of the means for applying the recording ink to the recording medium and the means for applying the liquid composition to the recording medium is an ink-jet means.

66. An ink-container comprising a container part containing an ink, wherein the recording ink according to claim 39 is contained as said ink.

67. A recording ink suitable for use in image recording together with a liquid composition containing a compound having a first polarity, wherein the recording ink comprises a coloring material having a second polarity opposite to the first polarity and a water-soluble polymeric compound having a group, which causes intramolecular polarization, and exhibiting nonionic properties in a liquid, and wherein the water-soluble polymeric compound is a water-soluble polymeric compound having a repeating unit represented by the general formula

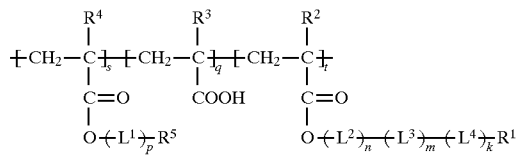

wherein $R^1$ is hydrogen, a methyl group, an ethyl group or $R^5$, where $R^5$ is one of the alicyclic, nitrogen-containing heterocycles of the formulae

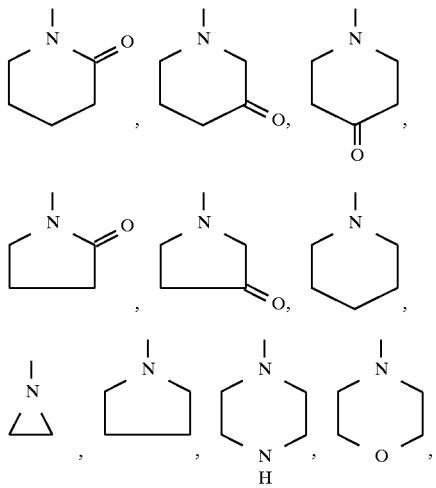

$R^2$ to $R^4$ are, independently of one another, hydrogen or an alkyl group having 1 to 3 carbon atoms, $L^1$ to $L^4$ are, independently of one another, a divalent group having a structure represented by —A—O— (—A— is an alkylene group having 2 to 4 carbon atoms, which may be substituted by a methyl or ethyl group), s, t and q are proportions of copolymerization, the sum of s and t is 90 to 99% by weight, q is 1 to 10% by weight, n and k are integers the sum of which ranges from 10 to 30, m is an integer of 15 to 30, and p is an integer of 1 to 5.

68. The recording ink according to claim 67, wherein the water-soluble polymeric compound is a copolymer of (a) an acrylic ester of an ethylene oxide or propylene oxide adduct of a substituted morpholine, (b) acrylic acid and (c) a compound represented by the general formula

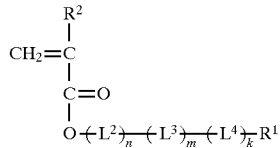

wherein $R^1$, $R^2$, $L^2$ to $L^4$, n, m and k have the same meaning as defined in the general formula (1).

69. The recording ink according to claim 67, wherein the water-soluble polymeric compound is a water-soluble polymeric compound having a repeating unit represented by the general formula

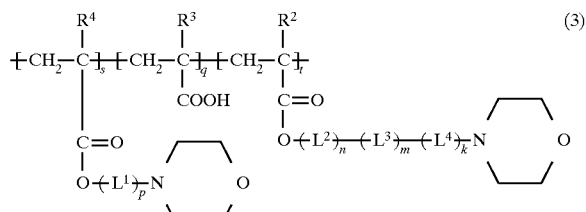

wherein $R^2$ to $R^4$, $L^1$ to $L^4$, k, n, m, p, q, s and t have the same meaning as defined in the general formula (1).

70. The recording ink according to claim 67, wherein the water-soluble polymeric compound has a molecular weight of from 5,000 to 300,000 as determined by gel permeation chromatography.

71. The recording ink according to claim 70, wherein the water-soluble polymeric compound has a molecular weight of from 5,000 to 50,000 as determined by gel permeation chromatography.

72. A process of recording an image on a recording medium by using in combination a liquid composition containing a compound having a first polarity, and a recording ink comprising a coloring material having a second polarity opposite to the first polarity and a water-soluble polymeric compound having a group, which causes intramolecular polarization, and exhibiting nonionic properties in a liquid, which the process comprises the steps of:

(A) applying the liquid composition to at least an image-forming region of the recording medium; and (B) applying the recording ink to the image-forming region of the recording medium.

73. An image-recording apparatus comprising:

a first recording unit equipped with a liquid composition-containing part which contains a liquid composition containing a compound having a first polarity, and a liquid composition-applying means for applying the liquid composition to a recording medium;

a second recording unit equipped with a recording ink-containing part which contains a recording ink comprising a coloring material having a second polarity opposite to the first polarity and a water-soluble polymeric compound having a group, which causes intramolecular polarization, and exhibiting nonionic properties in a liquid, and a recording ink-applying means for applying the recording ink to a recording medium.

74. An ink container comprising an ink-containing part which contains an ink, wherein the recording ink according to claim 67 is contained as said ink in the ink-containing part.

75. A recording unit comprising a recording ink-containing part which contains the recording ink according to claim 67 and a means for applying the recording ink to a recording medium.

76. An ink set comprising in combination:

i) a liquid composition containing a compound having a first polarity; and ii) the recording ink according to claim 67, wherein the recording ink is a color ink using, as the coloring material, a coloring material for yellow, magenta, cyan, black, red, blue or green, and at least one ink of these color inks is combined with the liquid composition.

77. The process according to claim 27, wherein the water-soluble polymeric compound is a water-soluble polymeric compound having a repeating unit represented by the general formula

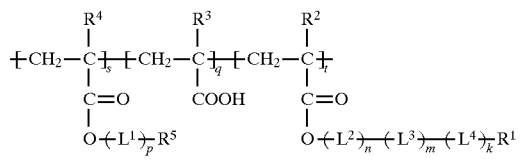

wherein $R^1$ is hydrogen, a methyl group, an ethyl group or $R^5$, where $R^5$ is one of the alicyclic, nitrogen-containing heterocycles of the formulae

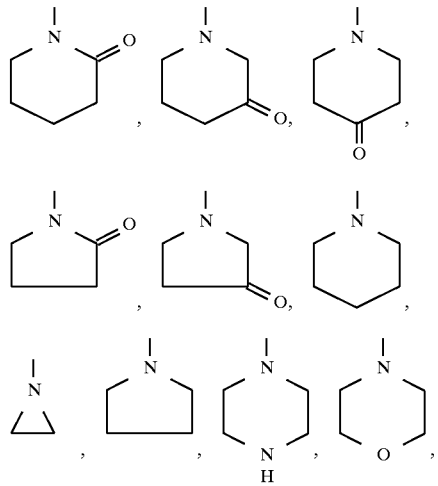

$R^2$ to $R^4$ are, independently of one another, hydrogen or an alkyl group having 1 to 3 carbon atoms, $L^1$ to $L^4$ are, independently of one another, a divalent group having a structure represented by —A—O— (—A— is an alkylene group having 2 to 4 carbon atoms, which may be substituted by a methyl or ethyl group), s, t and q are proportions of copolymerization, the sum of s and t is 90 to 99% by weight, q is 1 to 10% by weight, n and k are integers the sum of which ranges from 10 to 30, m is an integer of 15 to 30, and p is an integer of 1 to 5.

78. A recording ink suitable for use in image recording using an ink-jet system, comprising a coloring material and a water-soluble polymeric compound having a repeating unit represented by the general formula

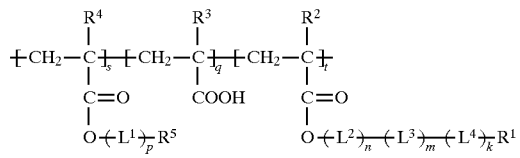

wherein $R^1$ is hydrogen, a methyl group, an ethyl group or $R^5$, where $R^5$ is one of the alicyclic, nitrogen-containing heterocycles of the formulae

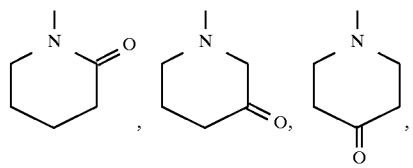

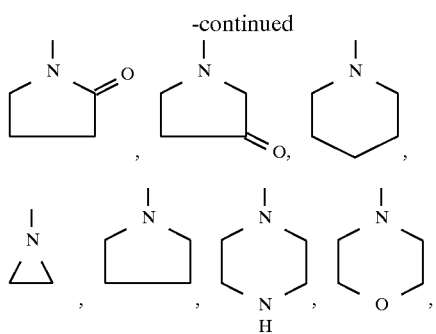

$R^2$ to $R^4$ are, independently of one another, hydrogen or an alkyl group having 1 to 3 carbon atoms, $L^1$ to $L^4$ are, independently of one another, a divalent group having a structure represented by —A—O— (—A— is an alkylene group having 2 to 4 carbon atoms, which may be substituted by a methyl or ethyl group), s, t and q are proportions of copolymerization, the sum of s and t is 90 to 99% by weight, q is 1 to 10% by weight, n and k are integers the sum of which ranges from 10 to 30, m is an integer of 15 to 30, and p is an integer of 1 to 5.

79. The recording ink according to claim 78, wherein the water-soluble polymeric compound is a copolymer of (a) an acrylic ester of an ethylene oxide or propylene oxide adduct of a substituted morpholine, (b) acrylic acid and (c) a compound represented by the general formula

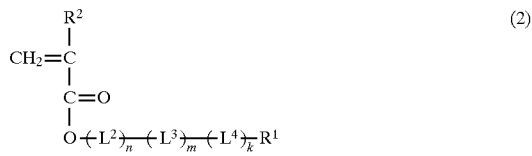

wherein $R^1$, $R^2$, $L^2$ to $L^4$, n, m and k have the same meaning as defined in the general formula (1).

80. The recording ink according to claim 78, wherein the water-soluble polymeric compound is a water-soluble polymeric compound having a repeating unit represented by the general formula

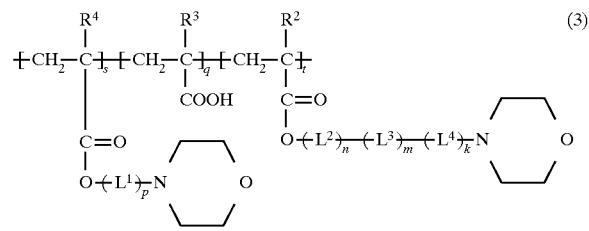

wherein $R^2$ to $R^4$, $L^1$ to $L^4$, k, n, m, p, q, s and t have the same meaning as defined in the general formula (1).

81. The recording ink according to claim 78, wherein the water-soluble polymeric compound has a molecular weight of from 5,000 to 300,000 as determined by gel permeation chromatography.

82. The recording ink according to claim 81, wherein the water-soluble polymeric compound has a molecular weight of from 5,000 to 50,000 as determined by gel permeation chromatography.

* * * * *

UNITED STATES PATENT AND TRADEMARK OFFICE
CERTIFICATE OF CORRECTION

PATENT NO. : 5,866,638

DATED : February 2, 1999

INVENTOR(S): MASAKO SHIMOMURA, ET AL.  Page 1 of 3

It is certified that error appears in the above-identified patent and that said Letters Patent is hereby corrected as shown below:

ON THE COVER PAGE

Item [56] OTHER PUBLICATIONS:

Line 2, "Ink Inkjet" should read --Inkjet Ink--.
　　Line 5, "andTranslation)." should read
--and Translation).--.

Item [56] Attorney, Agent, or Firm:

"Harpr" should read --Harper--.

IN THE DISCLOSURE

COLUMN 9:

Line 19, "composition)" should read --composition")--.
　　Line 55, "tonically" should read --ionically--.
　　Line 58, "tonically" should rad --ionically--.

COLUMN 10:

Line 47, "an" should read --a--.

COLUMN 12:

Line 38, "become" should read --becomes--.

UNITED STATES PATENT AND TRADEMARK OFFICE
CERTIFICATE OF CORRECTION

PATENT NO. : 5,866,638

DATED : February 2, 1999

INVENTOR(S): MASAKO SHIMOMURA, ET AL.

It is certified that error appears in the above-identified patent and that said Letters Patent is hereby corrected as shown below:

COLUMN 14:

Line 50, "kagation" should read --kogation--.

COLUMN 24:

Line 27, "compound" (first occurrence) should be deleted.

COLUMN 29:

Line 19, "were" should read --was--.
    Line 31, Entire line should be deleted.

COLUMN 33:

Line 20, "toopenine" should read --to a face--.

COLUMN 36:

Line 40, "Polymeric" should read --polymeric--.

UNITED STATES PATENT AND TRADEMARK OFFICE
CERTIFICATE OF CORRECTION

PATENT NO. : 5,866,638

DATED : February 2, 1999

INVENTOR(S) : MASAKO SHIMOMURA, ET AL.

It is certified that error appears in the above-identified patent and that said Letters Patent is hereby corrected as shown below:

COLUMN 40:

Line 58, "ink-container" should read --ink container--.

Signed and Sealed this

Seventh Day of December, 1999

*Attest:*

Q. TODD DICKINSON

*Attesting Officer*  *Acting Commissioner of Patents and Trademarks*